US012486520B2

(12) United States Patent
Silver et al.

(10) Patent No.: US 12,486,520 B2
(45) Date of Patent: Dec. 2, 2025

(54) INSECT EXTRACELLULAR VESICLES FOR DELIVERY OF NUCLEIC ACIDS

(71) Applicant: Kansas State University Research Foundation, Manhattan, KS (US)

(72) Inventors: Kristopher Silver, Manhattan, KS (US); Yoonseong Park, Manhattan, KS (US)

(73) Assignee: Kansas State University Research Foundation, Manhattan, KS (US)

(*) Notice: Subject to any disclaimer, the term of this patent is extended or adjusted under 35 U.S.C. 154(b) by 963 days.

(21) Appl. No.: 17/635,036

(22) PCT Filed: Aug. 14, 2020

(86) PCT No.: PCT/US2020/046402
§ 371 (c)(1),
(2) Date: Feb. 14, 2022

(87) PCT Pub. No.: WO2021/030699
PCT Pub. Date: Feb. 18, 2021

(65) Prior Publication Data
US 2022/0356492 A1    Nov. 10, 2022

Related U.S. Application Data

(60) Provisional application No. 62/887,067, filed on Aug. 15, 2019.

(51) Int. Cl.
C12N 15/88      (2006.01)
A01N 63/60      (2020.01)
C12N 15/113     (2010.01)

(52) U.S. Cl.
CPC ............. *C12N 15/88* (2013.01); *A01N 63/60* (2020.01); *C12N 15/113* (2013.01); *C12N 2310/14* (2013.01); *C12N 2320/32* (2013.01)

(58) Field of Classification Search
CPC ........ A01N 63/60; C12N 15/87; C12N 15/88; C12N 15/113; C12N 2310/14; C12N 2320/32
See application file for complete search history.

(56) References Cited

U.S. PATENT DOCUMENTS

2017/0325457 A1   11/2017   Heidebrecht, Jr. et al.

OTHER PUBLICATIONS

El-Andaloussi, S. et al., Nature Protocols, vol. 7 No. 12, p. 2112-2126 (Nov. 15, 2012) (Year: 2012).*
Goodman, C. et al., In Vitro Cellular Developmental Biology, vol. 48, p. 426-433 (Jun. 30, 2012) (Year: 2012).*
Hakeemi, M. et al., BMC Biology, vol. 20:38, p. 1-13 (Feb. 8, 2022) (Year: 2022).*
Hapairai L. et al., Scientific Reports, vol. 7:13223, p. 1-11 (Oct. 16, 2017) (Year: 2017).*
Kayukawa, T. et al., Scientific Reports, vol. 3:1570, p. 1-9 (Mar. 28, 2013) (Year: 2013).*
Kim, H. et al., Entomological Research, vol. 45, p. 339-344 (Sep. 24, 2015) (Year: 2015).*
KÃ°thy-Sutus, E. et al., Cells, vol. 12:24, p. 1-15 (Dec. 21, 2022) (Year: 2022).*
Lopez, S. et al., Scientific Reports, vol. 9:4038, p. 1-13 (Mar. 11, 2019) (Year: 2019).*
Shtam, T. et al., Cell Communication & Signaling, vol. 11:88, p. 1-10 (Nov. 18, 2013) (Year: 2013).*
Tassetto, M. et al., Cell, vol. 169, p. 314-325 (Apr. 6, 2017) (Year: 2017).*
International Search Report and Written Opinion in corresponding PCT/US2020/046402, dated Jan. 7, 2021.
Tassetto, et al., "Circulating Immune Cells Mediate a Systemic RNAi-Based Adaptive Antiviral Response in *Drosophila*", Cell, 2017, 169(2), pp. 314-325.
Kim, et al., "Exosome isolation from hemolymph of Korean rhinoceros beetle, *Allomyrina dichotoma* (Coleoptera: Scarabaeidae)", Entomological Research, 2015, 45(6), pp. 339-344.
Silver, et al., "The Tribolium castaneum cell line TcA: a new tool kit for cell biology", Scientific Reports, 2014, 4, article No. 6840, 8 pages.
Mingels, et al., "Extracellular vesicles spread the RNA interference signal of Tribolium castaneum TcA cells", Insect Biochem Mol Biol, 2020, 122, 8 pages.
Pi, et al., "Nanoparticle Orientation to Control RNA Loading and Ligand Display on Extracellular Vesicles for Cancer Regression", Nat Nanotechnol, 2018, 13(1), pp. 82-89.
Cooper, et al., "Molecular mechanisms influencing efficiency of RNA interference in insects", Pest Manag Sci, 2019, 75(1), pp. 18-28.
101 Bio, Product p. P401—ExoFectin@ sRNA-into-Exosome Kit (Chemical), last accessed Nov. 11, 2022.
101 Bio, Product p. P402—ExoFectin® Plasmid DNA-into-Exosome Kit (DNA transfection kit for exosome), last accessed Nov. 11, 2022.
Pegtel, D. M. et al., "Functional delivery of viral miRNAs via exosomes", Proc Natl Acad Sci U S A 107, 6328-6333, doi:10.1073/pnas.0914843107 (2010).
Alvarez-Erviti, et al., "Delivery of siRNA to the mouse brain by systemic injection of targeted exosomes", Nat Biotechnol 29, 341-345, doi:10.1038/nbt.1807 (2011).

* cited by examiner

*Primary Examiner* — Celine X Qian
*Assistant Examiner* — Krishna N Ravindra
(74) *Attorney, Agent, or Firm* — Hovey Williams LLP; Crissa A. Cook

(57) ABSTRACT

Nucleic acid delivery vehicles for delivering nucleic acid, e.g., for RNAi to cells that are typically refractory to RNAi by using extracellular vesicles (EVs) from cultured beetle cells as delivery vehicles. Instead of using high levels of long dsRNA and transfection reagents to accomplish suppression of an mRNA target in cells that don't respond to treatment with naked dsRNA, this approach applies the dsRNA to cultured beetle cells, collects nucleic-acid loaded EVs from the culture, then treats our target cells with the intracellularly loaded EVs, which results in significant enhancement of the RNAi response and greater suppression of transcript levels.

21 Claims, 14 Drawing Sheets

(A) dsDuSnf7 exosomes (B) dsRnCapn2 exosomes

INSECT EXTRACELLULAR VESICLES FOR DELIVERY OF NUCLEIC ACIDS

CROSS-REFERENCE TO RELATED APPLICATIONS

The present application is the U.S. National Stage of International Patent Application No. PCT/US2020/046402, filed Aug. 14, 2020, which claims the priority benefit of U.S. Provisional Patent Application Ser. No. 62/887,067, filed Aug. 15, 2019, entitled INSECT EXTRACELLULAR VESICLES FOR DELIVERY OF NUCLEIC ACIDS, each of which is incorporated by reference in its entirety herein.

FEDERALLY SPONSORED RESEARCH OR DEVELOPMENT

This invention was made with government support under contract no. 2018-67030-28498 awarded by the United States Department of Agriculture. The government has certain rights in the invention.

BACKGROUND OF THE INVENTION

Field of the Invention

The present invention relates to nucleic acid-loaded insect extracellular vesicles as vehicles for improved delivery of nucleic acids to other species of cells and organisms.

Description of Related Art

RNA interference or "RNAi" is a process of sequence-specific down-regulation of gene expression (also referred to as "gene silencing" or "RNA-mediated gene silencing"), usually initiated by double-stranded RNA (dsRNA) that is complementary in sequence to a region of the target gene to be down-regulated. Current techniques for RNAi in insects result in poor sensitivity of many cultured cells to RNAi. Our method uses the efficiency of the RNAi response of cultured beetle cells to treatment with double-stranded RNA to enhance the RNAi response in targeted cell types. Our method not only improves efficiency, but also cuts out significant intermediary steps that require isolation of EVs and subsequent transfection and purification by directly treating our cultured cells with long dsRNA (that can be synthesized in the lab), isolating EVs, and treating target cells with the isolated EVs.

SUMMARY OF THE INVENTION

The present invention is broadly concerned with composition for delivery of nucleic acids, such as for inhibition of a target gene in a target organism or cell. The compositions generally comprise a plurality of beetle extracellular vesicles, each extracellular vesicle comprising a nucleic acid molecule, wherein said nucleic acid is specific for said target gene (e.g., dsRNA, at least one strand having a region of complementarity that is substantially complementary to at least a portion of an mRNA transcript of the target gene).

Also described herein are methods for generating custom extracellular vesicles as delivery vehicles for nucleic acids. The methods generally comprise incubating nucleic acid (e.g., dsRNA for RNAi) for a target gene with beetle cells in serum-free culture media for an effective period of time; and collecting extracellular vesicles secreted by the beetle cells, wherein the extracellular vesicles comprise at least a functional fragment of the nucleic acid encapsulated therein. Compositions of such custom extracellular vesicles are also disclosed, which are produced by such methods.

The present disclosure also concerns methods for inhibiting a target gene in a target organism or cell. The methods generally comprise contacting the target organism or cell with a composition comprising a plurality of beetle extracellular vesicles according to any of the embodiments described herein. These methods can be useful for organisms, such as mosquitos, which are typically refractory to RNAi.

Also, described herein are arthropod bait compositions for administration of nucleic acids in arthropods. The bait comprises a plurality of beetle extracellular vesicles (according to various embodiments described herein) and an edible arthropod attractant, each extracellular vesicle comprising a nucleic acid molecule specific for a target gene.

The present disclosure also concerns kits for generating custom extracellular vesicles as delivery vehicles for nucleic acids, comprising beetle cells, serum-free media, and instructions for incubating nucleic acid for a target gene with beetle cells to generate extracellular vesicles comprising at least a functional fragment of the nucleic acid.

DETAILED DESCRIPTION

Figure 1:
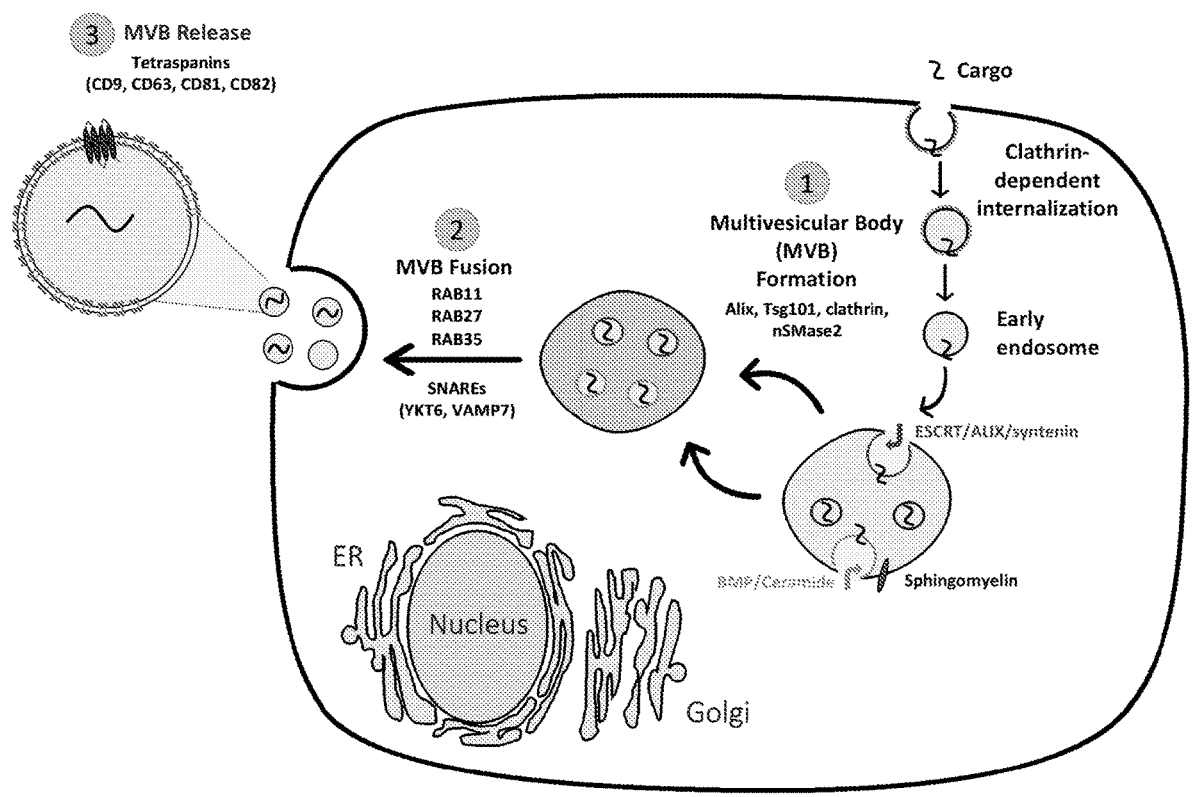
FIG. 1 is an illustration of a proposed exosome biogenesis pathways and genes involved in multivesicular (MVB) formation (1), fusion (2), and release (3).

The present disclosure is concerned with extracellular vesicles (EVs, aka exosomes) secreted by cultured insect cells, which have been loaded in situ (i.e., intracellularly) with nucleic acids for delivery to other types of cells and organisms. In one or more embodiments, the present disclosure is concerned with inhibiting gene expression using RNAi, advantageously using insect EVs. In particular, EVs are generated from cultured beetle cells as delivery vehicles containing nucleic acids for targeted inhibition of a target gene or gene product in vitro or in vivo via RNAi. Thus, in the target organism in vivo or cells in vitro, delivery of the nucleic acids via EVs results in inhibited, repressed, or suppressed expression, activity, or function of the target gene, mRNA transcripts, or expressed protein. Thus, methods of the invention involve custom development of nucleic acid-loaded insect EVs using the proprietary cell culture platform.

A variety of types of nucleic acid molecules (oligomers) can be used in the invention, including, without limitation, plasmid DNA, mRNA, dsRNA, ssRNA, microRNA, small interfering RNA (siRNA), long or short hairpin RNA (lhRNA or shRNA), RNAi, FANA-RNAi molecules, and combinations thereof. In one or more embodiments, dsRNA is used. Suitable dsRNA for use in the inventive extracellular vesicles can be prepared based upon all or a portion of any target gene sequence or corresponding cDNA of a target organism species to be modified via gene silencing according to one or more embodiments. In other words, the dsRNA used in the invention is specific to the target species of organism (or cells). The dsRNA is preferably from about 50 to about 500 base pairs (bp) in length, more preferably from about 100 to about 400 bp in length, and even more preferably from about 150 bp to about 300 bp in length (most preferably ~250 bp). The dsRNA will comprise a first (sense) strand and a second (antisense) strand. In one or more embodiments, at least one strand (i.e., the antisense strand) will be substantially complementary to at least a portion of an mRNA transcript of a target gene or an mRNA encoding a target gene product (protein). In other words, at least one strand of the dsRNA will have a region of complementarity that is substantially complementary to at least a portion of an mRNA of the target gene for the dsRNA molecule to direct cleavage of the RNA via RNAi. In some embodiments, the antisense strand includes a region of complementarity of at least about 21 (and preferably at least about 23) nucleotides in length. In one or more embodiments, the antisense strand includes a region of complementarity having full complementarity with an mRNA of the target gene.

Those skilled in the art will appreciate that dsRNA can be synthesized using primers designed from target gene cDNA sequences, which may be publicly available or ascertained via sequencing analysis, and commercially-available transcription kits. Usually, one would extract RNA from the target species, then use primers designed from public databases to synthesize cDNA, from which one would synthesize dsRNA. For example, in one or more embodiments, mRNA of a target species can be extracted and used to synthesize cDNA of which all or a portion is used as a template to transcribe dsRNA. Known cDNAs, such as from public databases, can also be used to synthesize the dsRNA without having to extract mRNA from the target species. Regardless of how it is synthesized, when introduced into the target organism or cells via the insect EVs, the dsRNA is cleaved into siRNAs approximately 20-25 bps in length, triggering RNAi and silencing the endogenous target gene. Gene silencing can occur by partially, substantially, or completely inhibiting, repressing, or suppressing the expression, activity, and/or function of the target gene or gene product.

In one or more embodiments, the target gene is an insect gene, such as a gene involved in viability, growth, development, metabolism, or reproduction of the insect, such that the cell or insect is killed, or the reproduction or growth of the cell or insect is stopped or retarded. This type of target gene is considered to be essential for viability, such that specific inhibition of the target gene leads to a lethal phenotype or decreases or stops insect infestation. Preferred target genes include those involved in vesicular trafficking, such as Snf7 and vacuolar ATPase subunit A, and orthologous genes from other target organisms, as well targets involved in cytoskeletal organization, heat shock proteins, chitin synthase, cell membrane proteins, proteasomes, apoptosis, vesicular trafficking, cell signaling, molting and development, detoxification of insecticides or natural toxins, and the like. Sequences are available in GenBank including SCR v-ATPase A (accession #CN498337.1), along with *Ae. aegypti* (accession #NC_035107.1, AF008922.1), incorporated by reference herein.

Although the present disclosure is exemplified in the context of application of the generated insect EVs in other insect species, the data also demonstrates feasibility and applicability of the underlying principles using insect EVs to effect delivery of nucleic acids to mammalian cells. It will further be appreciated that essential or non-essential gene targets can likewise be developed for mammalian organisms and cells for RNAi using the generated beetle EVs based upon published or synthesized sequence information. Further, the approach can be extended to RNAi in plant systems.

Regardless of the embodiments, insect EVs are prepared by culturing beetle cells with the target nucleic acid in serum-free media (e.g., fetal bovine serum, FBS-free) under appropriate culture conditions and for an effective period of time. A suitable, serum-free insect media will be used to culture beetle cells at ~27° C. (in an incubator, i.e., "culture conditions"), for at least 24 hrs, preferably from about 24 hrs to about 56 hrs, more preferably from about 36 hrs to about 56 hrs, even more preferably approx. 48 hrs. EX-CELL® 420 (Sigma-Aldrich) is a preferred cell culture media, which is a complete medium optimized for serum-free growth of insect cells, generally comprising glucose (~6 g/L) and $NaHCO_3$ (~0.35 g/L), and optionally protein (L-glutamine (~1 g/L)), or protein-free (without L-glutamine). In more detail, cultured beetle cells are seeded onto cell culture plates and left to grow under culture conditions until they are approx. 70 to 80% confluent. At that time, the cells are incubated with our target nucleic acid in serum-free media for an effective period of time, preferably at ~27° C., for at least 24 hrs, preferably from about 24 hrs to about 56 hrs, more preferably from about 36 hrs to about 56 hrs, even more preferably approx. 48 hrs.

The nucleic acids are taken up by the beetle cells, incorporated into the beetle cell exosome biogenesis pathway, and then released or secreted into the media as nucleic acid-loaded insect EVs. In one or more embodiments, the nucleic acid that is incubated with the beetle cells is for a target gene in a different species than the species of the beetle cells. In one or more embodiments, the entire nucleic acid may be loaded into the insect EVs. In one or more embodiments, functional fragments of the nucleic acids are loaded into the insect EVs (i.e., at least a sequence fragment complementary to the target gene for RNAi). In one or more embodiments, the EVs comprise RNA fragments ranging from about 15 to about 45 bp, preferably from about 17 to about 35 bp, with the majority of the fragments exported via the EVs from about 20 to about 30 bp, preferably from about 22 to about 28 bp in length. In other words, the nucleic acids are processed by the beetle cell (RNAi) machinery into smaller functional fragments for exportation via the EVs. Thus, unlike prior approaches using exosomes as nucleic-acid delivery vehicles, the current EVs according to embodiments of the invention are not "transfected" but rather, the nucleic acid payload is taken up by the beetle cells and loaded in situ (intracellularly) by the beetle cell machinery in culture into EVs, which are then secreted by the cells back into the culture media.

Figure 3:
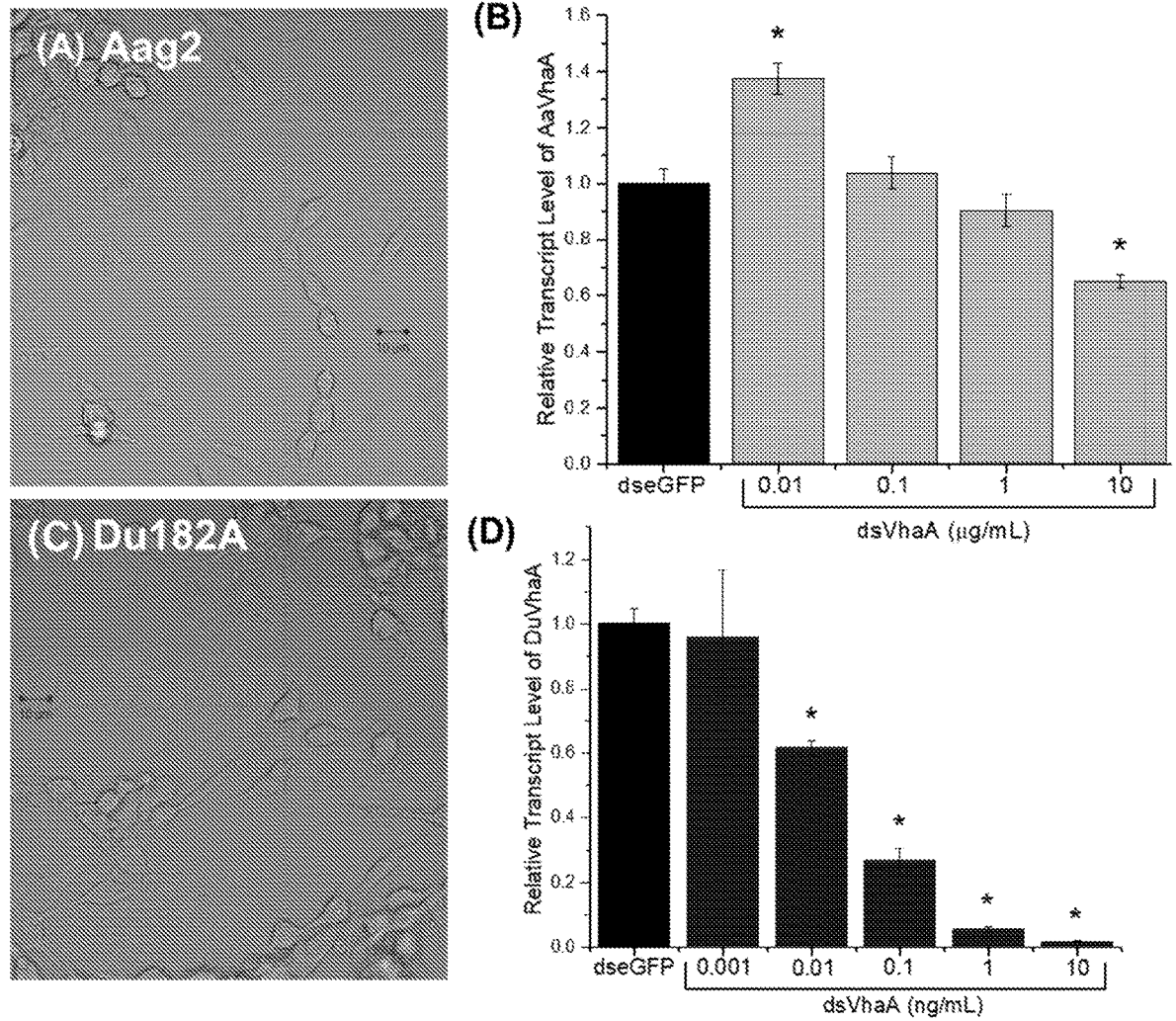
FIG. 3 shows (A) a photo of Aag2 cell line; (B) suppression of transcript levels of vacuolar ATPase subunit A (VhaA) in Aag2 cells following dsRNA treatment; (C) a photo of SCR cell line Du182A; and (D) suppression of transcript levels of vacuolar ATPase subunit A (VhaA) in SCR cells following dsRNA treatment. Aag2 cells were ~1 million-fold less sensitive to dsRNA than the SCR cells.

Suitable beetle cell lines for use in generating the insect EVs are generally those that are "sensitive" to RNAi, which, as used herein, means that only about 100 picograms/mL or less of dsRNA is needed to see effects of RNAi in the beetle cells when treated with their own target nucleic acid. This is demonstrated in the data in FIG. 3, and contrasted with a more refractory insect type, *Aedes aegypti*. In the data, when mosquito cells were treated directly with dsRNA, only about 40% suppression was noted, even when 10 µg/mL of dsRNA was used. However, when only 1 µg/mL of dsRNA was incubated with the beetle cells to generate dsRNA-loaded insect EVs, which were subsequently incubated with the mosquito cells, an 80-90% suppression of the target gene was observed (i.e., at least 2× (200%) increase in suppression). Thus, the approach can be used to further increase RNAi responses by at least 30%, preferably at least 40%, more preferably at least 50%, even more preferably at least 60%, preferably at least 70%, more preferably at least 100% increase in suppression of the target gene as compared to direct/naked dsRNA approaches, even while using significantly lower amounts of nucleic acid material. "Suppression" is measured based upon decreased transcript levels of the target gene.

Exemplary beetle cells lines (order Coleoptera) for use in generating the insect EVs include those of the genus *Tribolium* or *Diabrotica* with non-limiting examples including *Tribolium castaneum* (red flour beetle), *Diabrotica virgifera virgifera* (Western corn rootworm), *Diabrotica undecimpunctata* (spotted cucumber beetle or southern corn rootworm), *Diabrotica barberi* (Northern corn rootworm), *Diabrotica speciosa* (Cucurbit Beetle), *Diabrotica virgifera zeae* (Mexican corn rootworm), and the like.

The nucleic acid-loaded insect EVs are then collected from the beetle cell culture media, such as by centrifugation, isolation, purification, and the like. Commercial kits for exosome separation and isolation are available. In one or more embodiments, the separation protocol involves collecting the beetle cell culture media, centrifuging the media, collecting the supernatant, and treating it with one or more reagents designed for exosome isolation for a sufficient period of time. After treatment, the sample is then typically centrifuged, followed by removal of the supernatant, and resuspension of the pellet in buffered saline. The resulting suspension containing the isolated EVs can then be used to deliver the target nucleic acid to the target cells or organism. A detectable label, such as a fluorescent or magnetic moiety can be used to facilitate the separation of the insect EVs from the media if desired. There are also kits available that use antibodies and magnetic beads to capture exosomes, which have been established for use with mammalian exosomes.

The collected insect EVs containing the loaded nucleic acids are then used as delivery vehicles to introduce the nucleic acid (e.g., RNA) into the target cells in vitro or into the target organism in vivo for RNAi. The collected nucleic acid-loaded insect EVs can also be stored for later use, e.g., in buffered solution, until use, either under frozen (in suspension), lyophilized, or refrigerated conditions.

In one or more embodiments, the insect EVs can be used to transfect cells in vitro with the nucleic acid for targeted inhibition of one or more genes in the cells. The insect EVs are incubated with the target cells under appropriate cell culture conditions, whereupon the insect EVs are taken up by the cells and the nucleic acid is incorporated. A detectable label, such as a fluorescent or magnetic moiety (e.g., SYBR-select RNA stain), can be used to visualize uptake of the EVs into target cells. It will be appreciated that culture conditions will depend upon the type/species of the cells being cultured. In one or more embodiments, the cells are cultured with the insect EVs under ambient condition for at least 24 hrs, preferably from about 24 hrs to about 56 hrs, more preferably from about 36 hrs to about 56 hrs, even more preferably approx. 48 hrs.

The insect EVs are taken up by the cells, whereupon the nucleic acids inside the insect EVs are released and processed by the cell machinery resulting in inhibition of the target gene or gene products. The method is useful in research as well as in screening target genes. The target cells can be insect cells, mammalian cells, and/or plant cells.

Again, detectable labels can be used if desired to monitor progression of the uptake and processing in the target cell culture.

A method of silencing a target gene in a target insect using RNAi is also provided. Examples of target insects include any insect pest, without limitation, mosquitoes, beetles, caterpillars, cockroaches, locusts, termites, aphids, psyllids, ants, ticks, fleas, flies, spiders, and combinations thereof. Unless otherwise specified, the term "insect" is used more broadly herein to encompass arthropods (e.g., spiders) as well as to refer to both larval- as well as adult-stage insects. The method comprises providing an effective amount of the nucleic acid-loaded insect EVs, and placing the nucleic acid-loaded insect EVs in a location where insects may come into direct contact therewith. For example, nucleic acid-loaded insect EVs can be applied to plants on which the target insect feeds. The nucleic acid-loaded insect EVs may be ingested or otherwise contacted by the target insect, injected into, or otherwise taken up by the target insect, wherein the nucleic acid in the insect EVs is released and triggers inhibition of the target gene. In one or more embodiments, the nucleic acids are dsRNA that is cleaved into siRNAs in the target insect, which triggers the gene silencing, e.g., via RNAi.

In one or more embodiments, the nucleic acid-loaded insect EVs can be mixed with food or a food additive for oral delivery of the nucleic acids. In one or more embodiments, the solution is mixed with the food or food additive, optionally followed by drying the mixture. In one or more embodiments, the nucleic acid-loaded insect EVs are added to a liquid-based feed. It will be appreciated that this approach is particularly advantageous for delivering nucleic acids (such as for RNAi) for oral ingestion by a variety of chewing and/or sucking arthropods in larval and/or adult stages. For example, the nucleic acid-loaded insect EVs can be incorporated into an insect bait with an edible insect attractant in a form selected from the group powder, liquid, gel, self-sustaining gel-matrix, tablet, granular, and combinations thereof.

Thus, embodiments of the invention further include insect bait comprising the insect EVs and useful for facilitating administration of nucleic acids in insects. It will be appreciated that the bait could be in any form suitable for delivery and ingestion of the insect EVs (and thus may depend upon the habitat and target insect), but will typically be a liquid, gel, or self-sustaining gel-matrix, although solid baits (e.g., tablets, granules, etc.) are also contemplated. Exemplary carriers include, without limitation, agarose gel, gelatin gel, pectin gel, and combinations thereof. In one or more embodiments, the carrier is agarose gel, which is especially suited for aquatic habitats and breeding grounds.

As noted, the foregoing methods and insect EVs can also be adapted for delivering nucleic acids to other organisms and cells. For example, the approach can be used with plant cells and plants, as well as other animals and animal cells, such as other types of invertebrates besides insects, as well as vertebrates, such as mammals, birds, reptiles, amphibians, and fish, and cells thereof. Thus, the insect EVs can be used to transfect plant or animal cells in vitro with the nucleic acid for targeted inhibition of one or more genes in the cells, such as by culturing the plant or animal cell with the insect EVs as described above. A method of silencing a target gene in a target plant or animal organism using RNAi is also provided. The method comprises introducing the insect EVs into the plant or animal organisms, such as by direct physical contact (e.g., applying a composition comprising the insect EVs to the plant or animal organism tissue), injection, feeding, and the like. In the case of plants, compositions comprising the insect EVs may be applied to the soil or growth medium for the plant, such as for uptake through the root system. The EVs may be combined with various agronomically- or pharmaceutically-acceptable delivery vehicles to facilitate application and/or administration of the insect EVs to the plant or animal organism.

Depending upon the mode of action, the nucleic acids will cause phenotypic changes in the organisms or cell, resulting in e.g., mortality, increased susceptibility to insecticide, decreased mobility, decreased fertility, or decreased ability to proliferate, etc. Thus, in the case of insects, such methods can be used to inhibit or control a pest infestation and decrease pest damage. The method can be used to interfere with the growth and development of the organism, including completely silencing the target gene leading to mortality, or otherwise partially or completely silencing the expression, activity, or function of the target gene leading to increased susceptibility of the target organisms to pesticides, insecticides, herbicides, etc. Alternatively, the nucleic acids can be used to target susceptibility genes whose expression confers a weakness to the organism, thereby increasing (via knockdown of the susceptibility gene) the tolerance of the organism to a variety of environmental factors or externally applied pesticides, insecticides, herbicides, etc. In general, the reduction in transcript levels from gene silencing results in lowered levels of the target protein, resulting in corresponding phenotypic changes in the modified organism. Modified organisms are also provided, which have been modified using insect EVs. The modified organisms have one or more phenotypic changes due to the inhibition of the target gene via the insect EVs. Thus, the modified organisms have decreased levels of mRNA transcripts of a target gene or decreased levels of target gene products.

In the context of insects or other pests, the present invention has the distinct advantage of being an organism-specific method of pest control. Because the nucleic acids which are used to develop the insect EVs and insect bait can be designed based on specific gene sequences of a target pest species, the baits are safe to other organisms. Further, it has been found that when the insect EVs are used as delivery vehicles for the nucleic acid, substantially reduced levels of nucleic acid need to be used to see adequate inhibition of the target gene, as discussed herein.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

The "inhibition," "silencing," or "knock down" of the expression, activity, or function of a gene, as used herein, is intended to refer to any suitable method of reducing or even completely suppressing protein expression from a gene or a coding sequence, including methods of reducing mRNA transcripts, as well as the levels of protein produced as a result of gene transcription to mRNA and subsequent translation of the mRNA. Gene inhibition may be effective against a native gene associated with a trait, e.g., to provide the organism with a diminished level of a protein encoded by the native gene or with reduced levels of an affected metabolite.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Introduction

The work here demonstrates that extracellular vesicles (EVs) isolated from cultured beetle cells are able to enter not only beetle cells of the same species, but also to enter cells of other insect species, including mosquitos. This uptake is so effective, and the RNAi response of the cultured beetle cells is so efficient that it results in a significant increase in suppression of target transcript levels.

Study Overview

Exosomes have gained attention over the last decade in biomedical research as potential diagnostic markers for disease, vehicles for intercellular communication, and as potential delivery vehicles for therapeutic interventions, particularly since they can have significant effects on gene expression of targeted cells. In contrast, very little is known about the composition or functional roles of exosomes in insects, or the potential of exosomes to be applied in novel or existing insect pest control strategies. Given that mammalian exosomes are important for cell-to-cell communication in health and disease and that they can be used for delivery of specific nucleic acid or protein cargoes to specific cell types, we hypothesize that exosomes would also play important roles in intercellular communication in insects as well. Unfortunately, exosomes are a mostly unexplored area of insect biology, though a few studies hint at their importance in development, immunity, reproductive success, and communication between pathogens and their human or insect hosts. More recently, tantalizing preliminary data also suggest that exosomes derived from cultured *Diabrotica undecimpuncta howardi* (southern corn rootworm, SCR) cells may serve as carriers for delivering RNA interference (RNAi) signals between cultured insect cells of the same species and between different species. The Du182a cell line from *Diabrotica undecimpunctata* was developed at the USDA. Here we study exosomes as a key component in the transport of systemic RNAi signals throughout Coleopteran insects, like SCR, and that exosomes from SCR cells may be able to enhance RNAi in refractory insects.

Study of exosome formation and the systemic spread of RNAi in SCR cultured cells and western corn rootworm (WCR) (*Diabrotica virgifera virgifera*) whole insects. An RNAi of RNAi approach is used to suppress transcript levels of genes expected to play roles in exosome biogenesis, export, and import, and observe the effects on the systemic RNAi responses in an SCR cell line. Subsequent experiments are conducted to determine if suppression of these targets impairs systemic RNAi responses in SCR and WCR females that are fed dsRNA targeting transcripts exclusively expressed in the ovaries.

Evaluation of the ability of exosomes to enhance RNAi in insect orders that typically demonstrate refractory RNAi response. Exosomes derived from SCR cells treated with double-stranded (dsRNA) specific to a target insect species are used to enhance RNAi responses. Insect species for testing, belong to the order Lepidoptera and include European corn borer (*Ostrinia nubilalis*, Lepidoptera), and fall armyworm (*Spodoptera frugiperda*).

Exosomes can be used to enhance RNAi in insects that display a moderately or highly inefficient response to direct treatment with dsRNA. A broader understanding of the biogenesis of exosomes and their ability to move between insect cells permits exploration of these membrane vesicles as delivery vehicles for cargos other than dsRNA for insect control and their broader roles in insects and their interaction with the environment. Exosomes are also thought to be involved in immune responses and cross-species communication, including those between insects and microbes and insects and plants, highlighting their future potential as targets for insecticide development or manipulation for modulation of insect vector capacity or fecundity.

Background: Summary Of Existing Body Of Knowledge

Exosomes

Exosomes are small secreted vesicles (~40-100 nm in diameter) that are produced by many different tissues and cell types with important roles in intercellular communication. Exosomes originate from the endosomal pathway (FIG. 1). Endosomes in the cytoplasm undergo reverse budding in the membrane to form intraluminal vesicles as a result either of the activity of endosomal sorting complex required for transport (ESCRT) or ceramide-rich domains. This reverse budding from the cytoplasm allows specifically-tagged cargoes to be loaded into the intraluminal vesicles, permitting specific tailoring of exosomal contents. Endosomes containing intraluminal vesicles are termed multivesicular bodies (MVBs). MVBs can then be directed to lysosomes for degradation or towards the plasma membrane for fusion and release of intraluminal vesicles (now exosomes). MVBs sent to the cytoplasmic membrane arrive there through the activity of RABs 11, 27, and 35. As illustrated in FIG. 1, fusion of MVBs with the membrane then occurs with the help of SNARE proteins, releasing the exosomes into the extracellular space. The exosomes at this point are free to travel to other cells or tissues within the organism or to be transferred to other organisms.

Exosomes are an exciting new area of research in biomedical circles and a great effort is being expended to understand exosome biogenesis and develop them for delivery of therapeutics and diagnosis of medical conditions. In mammals, exosomes are being explored for their diverse roles in delivering RNAs to distant cells and tissues and as therapeutic and diagnostic markers. Exosomes are particularly noted for their roles in immunomodulation. With respect to human disease, exosomes offer an extraordinary opportunity to manipulate the function of the immune system to enhance the body's defenses to suppress the growth and replication of cancer cells. In addition to manipulating and changing immune responses, now that biogenesis pathways in mammals are better understood, exosomes are being engineered to carry specific nucleic acid or protein cargoes. Using a mutant coat protein from HIV, called Nef, researchers were able to insert fusion proteins into exosomes where they are protected from external degradation. Others have taken this idea a step further and engineered exosomes to include a fusion protein from rabies virus. In this way, the exosomes were able to penetrate the blood brain barrier and deliver their cargo to neurons in the brain, a notoriously difficult therapeutic target. These studies serve to show the importance of exosomes in mammalian biology and their potential for therapeutic interventions.

The same effort is not yet being made in insects, though the benefits of exploring the biogenesis and roles of exosomes in insects are as great. In insects, researchers are only beginning to understand the vital roles exosomes play in development, reproduction, secretion, and even vectoring of disease. In Drosophila, exosomes are important in the development of wing and neuromuscular junctions by carrying wingless and establishing the wing axes and fostering neuron outgrowth. Exosomes also play significant roles in reproduction in Drosophila. Exosomes secreted by male Drosophila accessory glands modify female behavior, suppressing additional mating behavior in these females. Additionally, in two species of hunting wasps, venom proteins, instead of using transcription signals, were actually secreted into the venom fluid via exosome. In mosquito and sand fly, exosomes carry infectious DENV or Leishmania particles that are injected into or egested onto, respectively, the human host and may play an important role in spreading these pathogens. These findings underline the importance of exosomes in insect physiology and highlight the potential exosomes may have as delivery vehicles in settings outside of human health, including in enhancing RNAi for insect pest management.

Identifying the components of the exosome biosynthesis pathway will open new avenues for research into insect development, immunity, and intercellular communication, giving us a deeper understanding of insect biology as a whole. We may also be able to exploit this newfound knowledge to develop new pest control strategies or chemistries that target exosomal pathways. In addition, understanding exosome biogenesis will open the door to engineering insect exosomes to either target specific species or tissues (as has been done in mammals), or carry more diverse cargoes, including specifically tailored nucleic acids or proteins.

These studies can help unravel the lingering mystery of how an RNAi signal spreads systemically in some insects and develop a novel method for enhancing RNAi in agriculturally important insects that typically do not respond efficiently to treatment with dsRNA, including Lepidoptera. Despite having a deep understanding of the systemic spread of RNAi signals in C. elegans, our understanding of the systemic spread of RNAi in insects is limited, and many of the orthologs of proteins in C. elegans that are involved in systemic RNAi do not seem to have the identical functions in insects. This project, given that exosomes seem to be involved in transmitting RNAi signals from cell to cell (see preliminary data) will help fill in these gaps in our knowledge. At the same time, our in vivo testing of exosomes in refractory insects will also form a firm basis for the development of exosomes as delivery vehicles for RNAi and eventual expansion of the use of RNAi for control of new pest species.

Diabrotica spp. (SCR and WCR) are the specific targets of the recently EPA-approved transgenic corn which expresses single hairpin RNAs specific to WCR Snf7. Accordingly, this project also provides an opportunity to understand the interactions between the target insects and a technology that could be dominant in the market for the management of WCR and other insect pests.

Models For Study

WCR is the most important pest of corn in the United States Corn Belt. WCR has been referred to as the billion-dollar pest, as losses associated with control and yield losses exceeds $1 billion annually. Whereas WCR has been used widely in research to understand mechanisms of RNAi in insects and a commercial product has been developed to target WCR through RNAi, WCR is very difficult and costly to rear in the laboratory and there is no corresponding in vitro model available. SCR, on the other hand, is very closely related to WCR, for example, there is 98% sequence similarity between Snf7 in SCR and WCR. Furthermore, WCR Snf7 and v-ATPase A generates similar mortality in SCR. SCR is a serious pest in its own right and can cause significant direct damage to cucurbits via larval feeding on roots and adult feeding on fruits in addition to vectoring bacterial wilt disease and squash mosaic virus. SCR is also highly sensitive to treatment with dsRNA, but, in contrast to WCR, a cell line is available for research for SCR, making SCR a superior model system for our experiments.

The highly versatile SCR research model that we have developed includes paired in vitro/in vivo study systems where hypotheses can be developed and tested in a simple, easily manipulated, highly efficient cell culture system that features largely homogenous cells. Experiments can then be moved to the whole SCR insect, where they hypotheses that were developed in vitro can be tested for their accuracy and validated, providing a "real world" test of the in vitro results. In this model system we can take advantage of the efficiency, low cost, and easy modified cultured insect cells to streamline and inform subsequent in vivo experiments that are often much more time consuming and costly.

The information acquired from our research may result in the development of a novel delivery method for RNAi pest management strategies that will broaden the utility of RNAi for insect control. In addition, we will also address attributes of pest and beneficial insects, including intra- or interspecies interactions and/or communication systems relevant to pest management practices because exosomes are widely accepted in mammalian systems to serve not only as intercellular communication vehicles, but also inter-specific communication vehicles.

RNAi Mode Of Action

RNAi is a conserved eukaryotic pathway by which dsRNAs direct the sequence-specific degradation of complementary messenger RNAs (mRNAs). RNAi has become an essential tool for studying gene function and has been described as a promising method for management of insect pests. RNAi as a pest management tool works by suppressing genes that are fundamental to insect survival, eventually leading to death.

Figure 2:
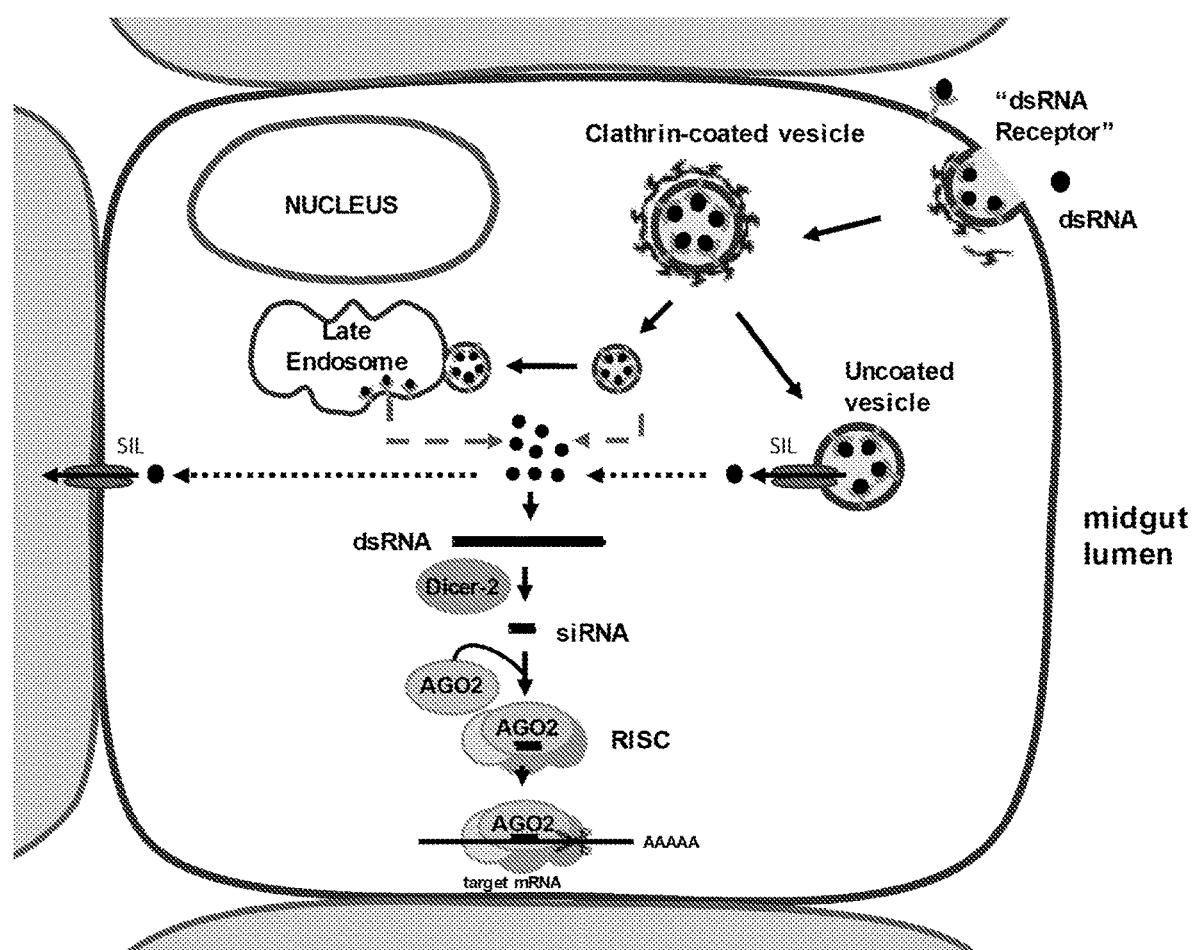
FIG. 2 is an illustration of a proposed cell machinery used for dsRNA uptake and processing in insects.

In eukaryotes, three major RNAi pathways have been described: microRNA (miRNA), piwiRNA (piRNA), and small interfering RNA (siRNA). The use of RNAi for pest management relies on the introduction of dsRNA, which activates the siRNA pathway. Successful oral responses to dsRNA in insects involves three key components: (1) uptake of the dsRNA from the midgut and intracellular transport, (2) processing of the dsRNA inside the cell, and (3) systemic spread of the RNAi signal. Among the insect orders for which RNAi responses have been evaluated, coleopterans exhibit the most robust oral and systemic responses. However, the cellular mechanisms involved in dsRNA uptake, processing, and spread are not fully understood. An understanding of the mechanisms of dsRNA in highly susceptible coleopterans (i.e., rootworms) will improve RNAi efficiency for the management of rootworms and other insect pests. A simplified hypothetical cell machinery for dsRNA uptake and processing in WCR is illustrated in FIG. 2 based on preliminary results obtained and information available for other coleopterans.

dsRNA Uptake

Two pathways that mediate dsRNA uptake have been identified: the transmembrane SID-1 channel protein-mediated pathway and the endocytic pathway. In the nematode, *Caenorhabditis elegans*, a combination of systemic RNAi-defective proteins 1 (SID-1) and 2 (SID-2), are involved in dsRNA uptake. Homologous sequences of the SID-1 gene have been identified in multiple insect orders, but functional studies have demonstrated that the presence of a SID-1-like gene does not necessarily result in a robust RNAi response. The endocytic pathway is mediated by the protein clathrin. This pathway was first linked to the RNAi response in insects when the silencing of clathrin (Chc) in *D. melanogaster* S2 cells reduced mortality of a lethal dsRNA. Functional screening of a *D. melanogaster* S2 cells dsRNA library found several genes involved in the endocytic pathway, including Clathrin heavy chain (Chc), Clathrin adaptor protein AP50, ADP ribosylation factor-like 1 (Arl1/Arf72A), Vacuolar $H_+$ ATPase (V-ATPase), and small GTPase Rab7. The requirement of the endocytic pathway for cell entry of dsRNA has also been linked to dsRNA uptake in other insects including the western corn rootworm. Additional components of the clathrin-mediated endocytosis include dsRNA receptors. The proteins Sr—CI and Eater were identified as potential receptors of dsRNA in *D. melanogaster* S2 cells and the desert locust, *Schistocerca gregaria*.

dsRNA Processing

The processing of dsRNA inside the cell takes advantage of cellular machinery that has evolved as a defense against viruses to process endogenous regulatory RNAs. The core components of dsRNA processing inside insect cells are similar to those described in other eukaryotes. Once a dsRNA has been taken up by the cell, the enzyme Dicer cleaves the molecule into 21-24 nucleotide siRNAs. After the dsRNA is diced, one strand of siRNA is loaded into the RNA Induced Silencing Complex (RISC). The siRNA guides the RISC complex to a target mRNA in a sequence-dependent manner, which is then cleaved by the Ago2 protein within the RISC. One difference between insects and other animals is that in nematodes and vertebrates, a single Dicer interacts with dsRNA and mRNA while in *Drosophila*, Dicer 1 (Dcr1) exclusively recognizes miRNA precursors, Dcr2 identifies dsRNA, and Dcr3 recognizes piRNA.

dsRNA Systemic Spread

After the dsRNA is taken up from the midgut and processed in the cell, the signal needs to spread between cells to generate a systemic response. In insects, the systemic spread of RNAi is supported by the strong response observed in some species and the knockdown of transcripts in distal tissues from the site where dsRNA was introduced. Even though systemic RNAi is observed in insects, the specific mechanisms and genes involved in the spread of dsRNA and signal form (dsRNA or siRNA) are yet to be unraveled. Two mechanisms for transport of dsRNA between cells have been suggested via exosomes or nanotube-like structures observed in cultured cells of *D. melanogaster* in the context of viral infection, but the particular mechanism has yet to be determined.

Strategies For Enhancing RNAi

Despite its enormous potential for effective and specific control of insect pests, the implementation of RNAi in pest control strategies has been limited. The main reason for this is the wide variability in the efficiency of RNAi responses in different species and orders of insects, particularly in Lepidoptera and Diptera. The mechanisms that may be responsible for the variable responses of insects to dsRNA treatment have been reviewed recently and include: instability of dsRNA (digestion by dsRNases), inefficient or incomplete internalization of dsRNA, low expression of RNAi machinery, and lack of systemic spread of the RNAi signal. To combat these effects and broaden the scope of RNAi use for pest control, researchers have used a variety of methods to enhance RNAi efficiency in insects. These methods are as diverse as the hypotheses for why RNAi responses are variable between insect species. Some methods that have been explored are simple and involve optimizing selection of target genes and the sequences within those genes for enhancing RNAi efficiency or using chemicals to inhibit dsRNases and prevent degradation of dsRNAs. Others modify or encapsulate dsRNAs inside liposomes or nanoparticles to enhance dsRNA stability and/or enhance dsRNA uptake. Biotechnology has also been used to express dsRNAs or hairpin RNAs in plants on which insect pests feed, in bacteria (mostly *E. coli*), viruses that infect either insects or the plants that they feed on, or fungi that are either pathogens of the insect or are eaten to also enhance dsRNA stability and/or enhance uptake of dsRNA into the insect. In plants, it was discovered that the RNAi machinery in the plants tended to process the dsRNAs that were expressed in the cytoplasm reducing the efficacy of this method of delivery. Instead, expression of dsRNAs in plant plastids (e.g. chloroplasts) dramatically increased the efficiency of suppression of transcript levels of target genes.

Despite the promise of these methods for enhancing RNAi efficiency in insect pests, use of these methods has not resulted in the production of any commercial products or transgenic plants with enhanced RNAi effects in insect species that are typically refractory to RNAi. The only product that has been approved by the Environmental Protection Agency in the United States, employs an RNAi mode of action against WCR in combination with expression of at least two *Bacillus thuringiensis* toxins. Thus, further research efforts are critical to find better, more efficient methods of dsRNA delivery that can be used in a wider range of insects so that RNAi can reach its full potential as part of pest management strategies. Exosomes are a largely unexplored area of insect physiology that may provide a solution to the challenges of applying RNAi as a control strategy in some pest insects. Data here shows that they can serve as potent delivery vehicles for enhancing RNAi in cultured cells from a refractory insect.

Example 1

Initial Studies

Extracellular Vesicles In SCR Cells

SCR cells (FIG. 3C) were cultured in serum-free media with dsRNA specific to the *Ae. aegypti* v-ATPase A gene. In more detail, cultured beetle cells are seeded onto 10 cm plates and left to grow until they are 70 to 80% confluent. At that time, the cells are treated with our target dsRNA (*Aedes aegypti* vacuolar ATPase A) or our control dsRNA (usually GFP, 1 µg dsRNA/mL media) in serum-free media.

Extracellular vesicles (EVs, aka exosomes) produced by the SCR cells were subsequently isolated from the conditioned media. Briefly, after 48 h, the media is collected, and EVs are isolated using the Total Exosome Isolation Reagent (cell culture media, Life Technologies). 5 mL of collected media are centrifuged at 2,000 g for 30 min, the supernatant is collected and treated with half the volume of the Total Exosome Isolation reagent. The sample is vortexed then kept at 4° C. overnight, then centrifuged at 4° C. at 10,000 g for 60 min. The supernatant is removed, and the pellet is resuspended in 100 µL 1× Phosphate buffered saline (PBS).

The collected EVs were then used to treat cultured Aag2 cells from *Aedes aegypti* (FIG. 3A). The suspension is then used to treat Aag2 cells grown in a 12 well plate. 33 µl of EV suspension is added to each well, then 48 h later RNA is isolated using Trizol Reagent (according to manufacturer's instructions). The RNA is quantified on a Nanophotometer (Implen) and 1 ug is used to synthesize cDNA using a commercial kit (Applied Biological Materials). 1 uL per reaction of cDNA mix was then used in quantitative PCR reactions. The gene target is vacuolar ATPase subunit A, RpS17 is used as the loading control. Experiments were repeated 3 times, with two technical replicates per sample. Changes in transcript levels are then calculated relative to RpS17 using the ΔΔCt method (Livak and Schmittgen 2001).

SCR cells were highly susceptible to treatment with dsRNA (FIG. 3D), whereas the Aag2 cell line, when incubated directly with dsRNA (no EVs), was much less sensitive to treatment with dsRNA (FIG. 3B). Subsequent testing of the SCR line revealed that conditioned, serum-free media taken from SCR cells treated with dsRNA could also induce an RNAi response in previously untreated SCR cells (not treated with dsRNA, data not shown).

Figure 4:
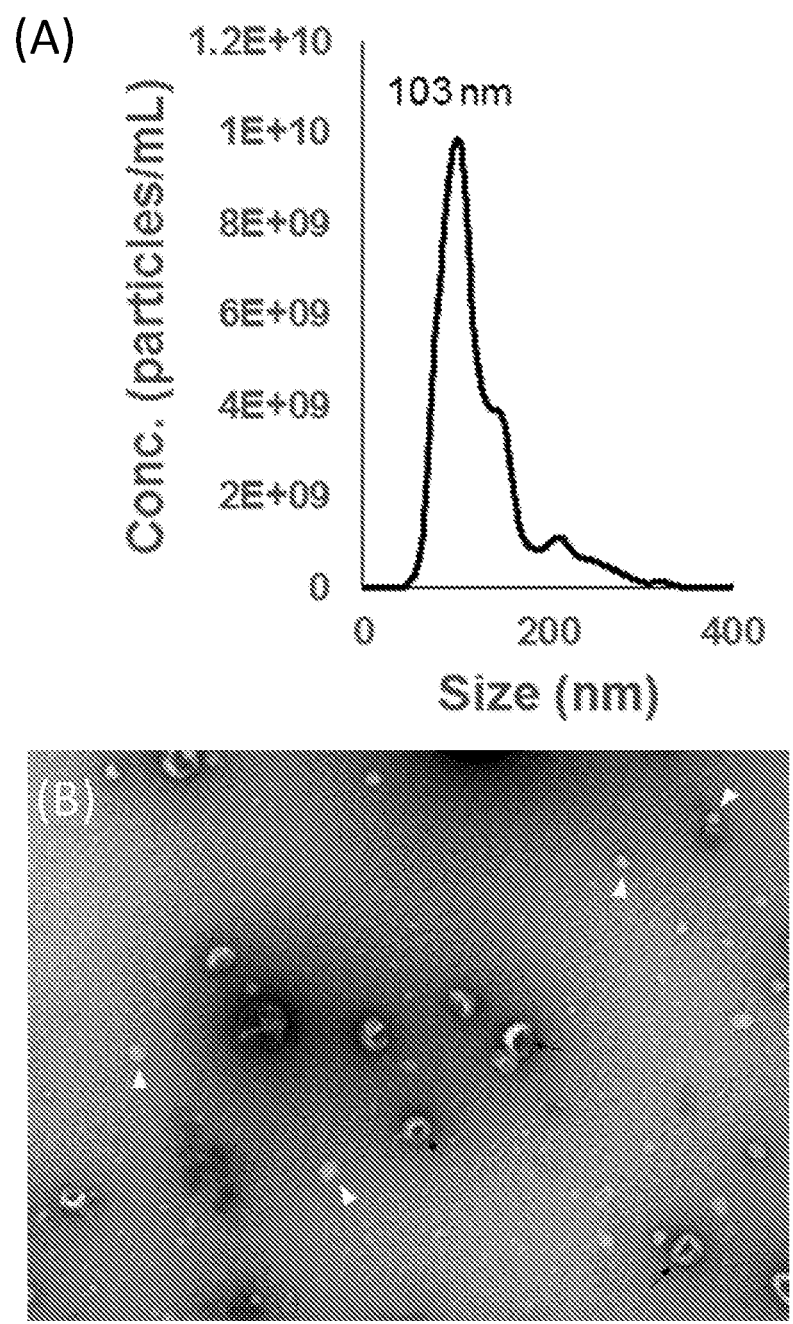
FIG. 4 shows (A) a graph of particle size based upon Nanosight analysis (A) and (B) TEM images of extracellular vesicles isolated from conditioned SCR media.

We investigated which components of the conditioned media were capable of transmitting the RNAi response. EVs isolated from the conditioned media were consistent in size (average diameter of 103 nm) and appearance (collapsed vesicles marked by dark arrows and intact exosomes with white arrows) with exosomal (40-150 nm) characteristics similar to what has been described in mammalian cells as shown in FIG. 4.

Figure 5:
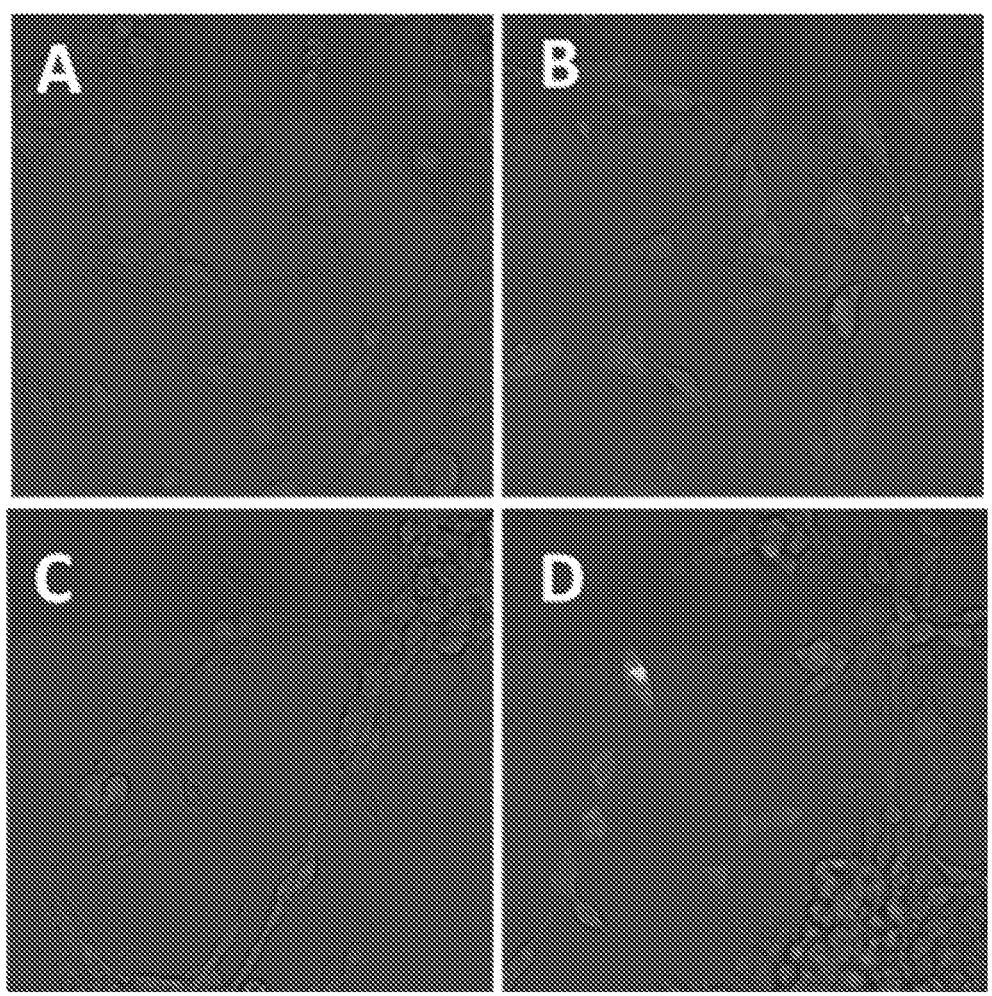
FIG. 5 shows images of SCR (A, B) or Aag2 (C, D) cells treated with dye only (A, C) or dye-labeled SCR exosomes (B, D), respectively. Blue is DAPI and green is Syto-select RNA stain.

Subsequent fluorescent labeling of SCR EVs allowed visualization of the fate of exosomes when used to treat SCR and Aag2 cells (FIG. 5). FIG. 5 includes images of the cells at 3 hrs after treatment, with SCR cells at the top (A, B) and Aag2 cells at the bottom (C, D). The cells were treated with dye only (left) or dye-labeled exosomes (right).

Cells were treated with dye only or dye-labeled SCR EVs, using DAPI SYTO-select RNA stain (Life Technologies). Confocal microscopy images revealed that labeled EVs were detectable inside SCR cells as soon as 30 min after treatment, and the fluorescence signal increased until 3 h after treatment. Labeled EVs produced from SCR cells were also detectable inside Aag2 cells, meaning that EVs from SCR were able to enter cultured cells from *Ae. aegypti*, a species from a different insect order. These results demonstrated that EVs have the potential to serve as delivery vehicles, carrying nucleic acid and protein cargoes between insect cells of both the same species, and cells of different species of insects.

Figure 6:
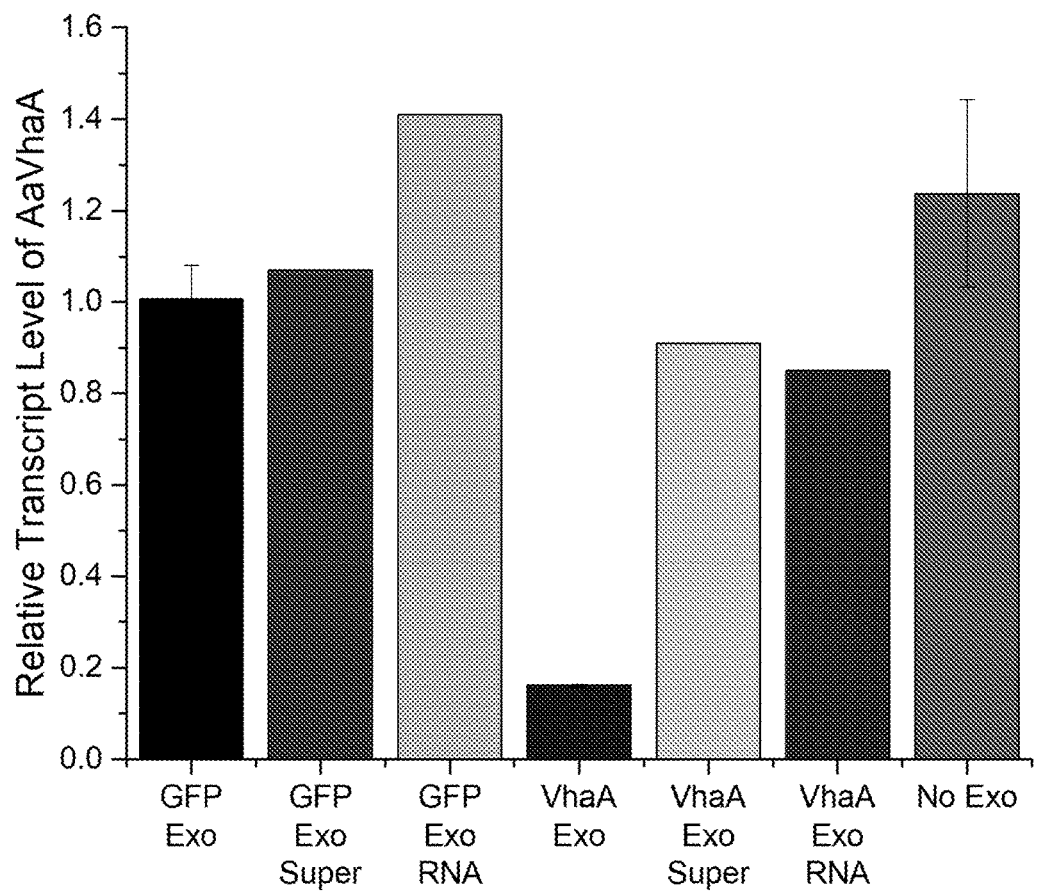
FIG. 6 is a graph showing transcript levels of v-ATPase subunit A following treatment of Aag2 cells with exosomes (Exo) isolated from SCR cells treated with dsGFP or dsVhaA. Negative controls include no exosomes or treatment with the exosome isolation supernatant (Super) or RNA from isolated exosomes (RNA).

Further, EVs may be able to deliver a systemic RNAi response from cell to cell in SCR and may be able to enhance RNAi responses in insect species typically refractory to RNAi. To explore these ideas, SCR cells were cultured in serum-free media with dsRNA specific to the *Ae. aegypti* v-ATPase A gene (AaVhaA). EVs produced by the treated cells were then isolated from the conditioned media. Naïve Aag2 cells were then treated with the isolated EVs and relative transcript levels of v-ATPase A. As shown in FIG. 6, transcript levels of Aag2 v-ATPase A were suppressed by treatment of Aag2 cells with EVs from cells treated with dsAaVha-A (VhaA exo), but not by EVs from cells treated with dsGFP (GFP exo), supernatants from EV isolation from cells treated with either dsRNA (GFP exo super, VhaA exo Super), or RNA isolated from EVs isolated from cells treated with either dsRNA (GFP exo RNA, VhaA exo RNA). This was achieved with both undiluted and diluted EVs (up to a 10-fold dilution of SCR EVs). In addition, treatment of Aag2 cells directly with RNA isolated from SCR EVs or with the supernatant from the EVs isolation procedures had no effect on v-ATPase A transcript levels, suggesting that only intact EVs derived from SCR cells treated with dsVhaA induced RNAi responses in Aag2 cells.

Figure 7:
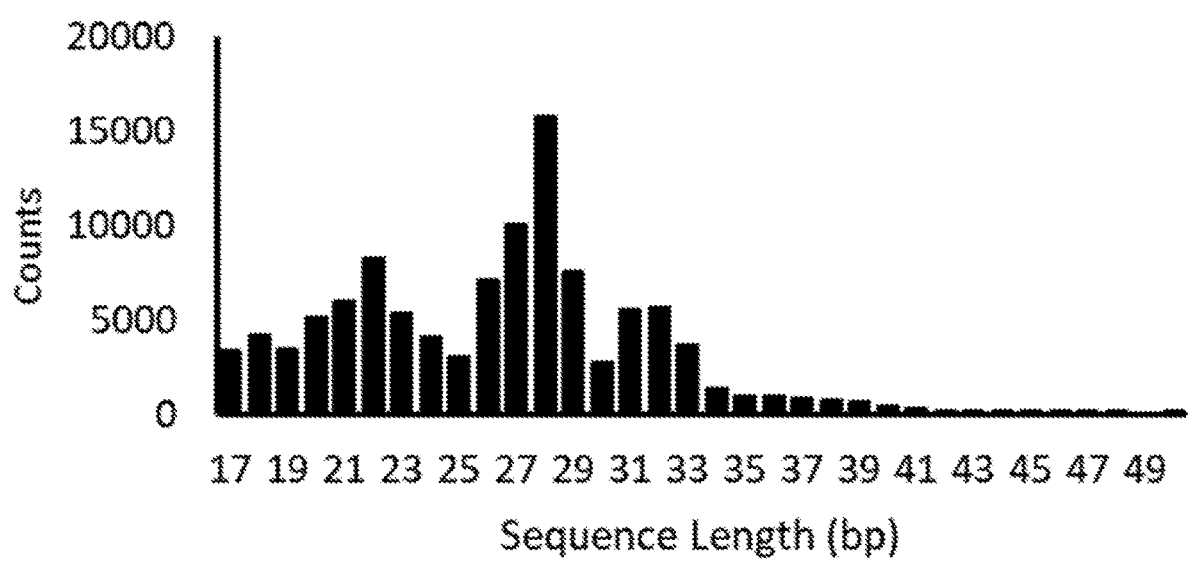
FIG. 7 is a graph of the sequence lengths of small RNAs isolated from EVs isolated from the conditioned media of SCR cells.

Subsequent experiments have focused on characterizing of the protein components and RNA contents of SCR EVs to determine how the RNAi signal is delivered. RNA samples from the SCR cell line were submitted for transcriptome and small RNA sequencing on the Illumina 6000 platform as well as from EVs isolated from either untreated SCR cells or those treated with dsGFP for mRNA and small RNA sequencing. Results from small RNA sequencing experiments reveal a bimodal distribution of small RNA sequences with peaks at 22 bp and 28 bp (FIG. 7).

Figure 8:
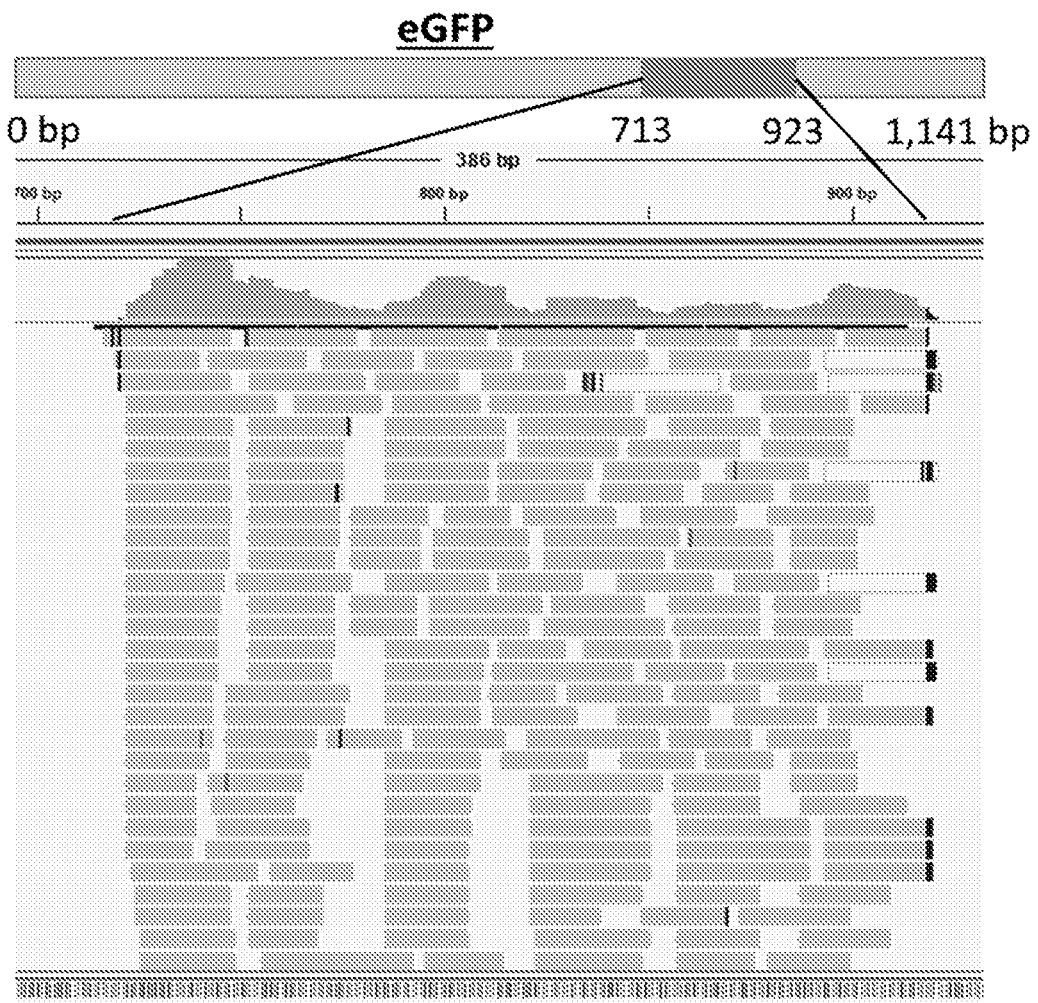
FIG. 8 illustrates mapping of small RNA sequences of exosome RNA from SCR cells treated with dsGFP to the GFP sequence.

In addition, analysis of small RNA sequences from EVs isolated from SCR cells treated with dsGFP showed the presence of numerous small RNAs that mapped to the GFP sequence used to synthesize dsRNA (FIG. 8), suggesting that EVs were transporting small RNAs produced by the RNAi machinery of the SCR cells in response to exogenous dsRNA treatment.

Figure 9:
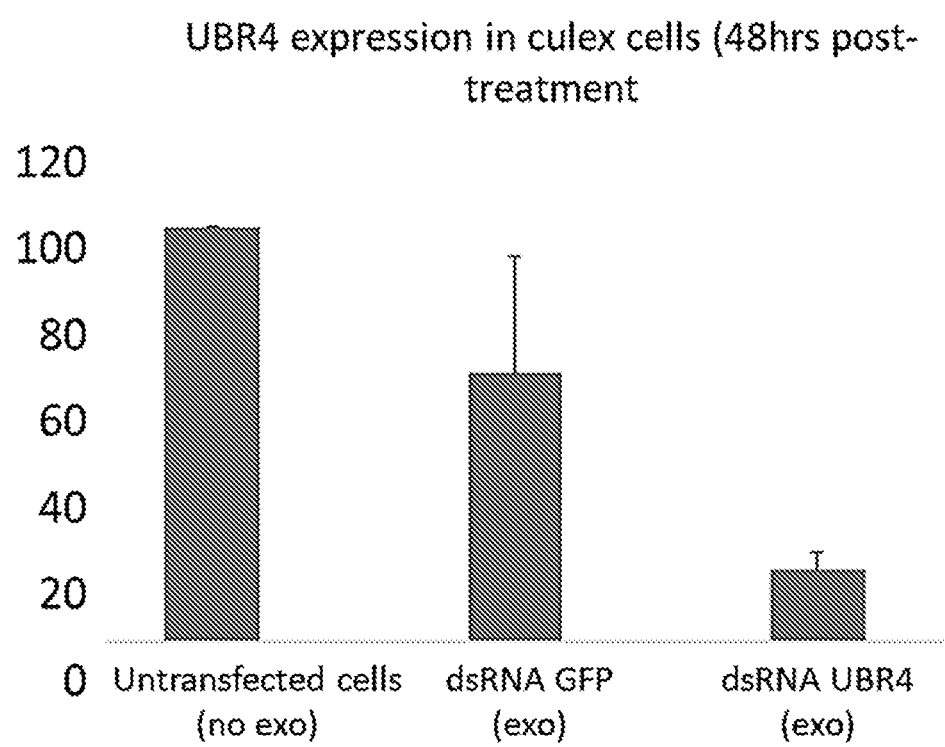
FIG. 9 is a graph showing suppression of UBR4 transcript levels in cultured *Cx. quiquefaciatus* cells following treatment with exosomes isolated from SCR cells treated with dsCqUBR4.

We have also conducted experiments to determine if SCR EVs are effective at enhancing RNAi in other mosquito species (*Culex quinquefasciatus*, southern house mosquito). We treated SCR cells with dsRNA for *Cx. quinquefasciatus* UBR4 and isolated EVs using established protocols. *Cx. quinquefasciatus* cells are typically highly refractory to RNAi and require use of transfection reagents to achieve even low levels of suppression of transcript levels. Treatment of cultured *Cx. quinquefasciatus* cells with EVs from SCR cells treated with dsCqUBR4 resulted in significant suppression (exGFP was 27% of exGFP control) of the target transcript levels (FIG. 9).

Our results show that EVs are capable of enhancing RNAi in cultured cells of two different mosquito species that are refractory to dsRNA treatment.

Figure 10:
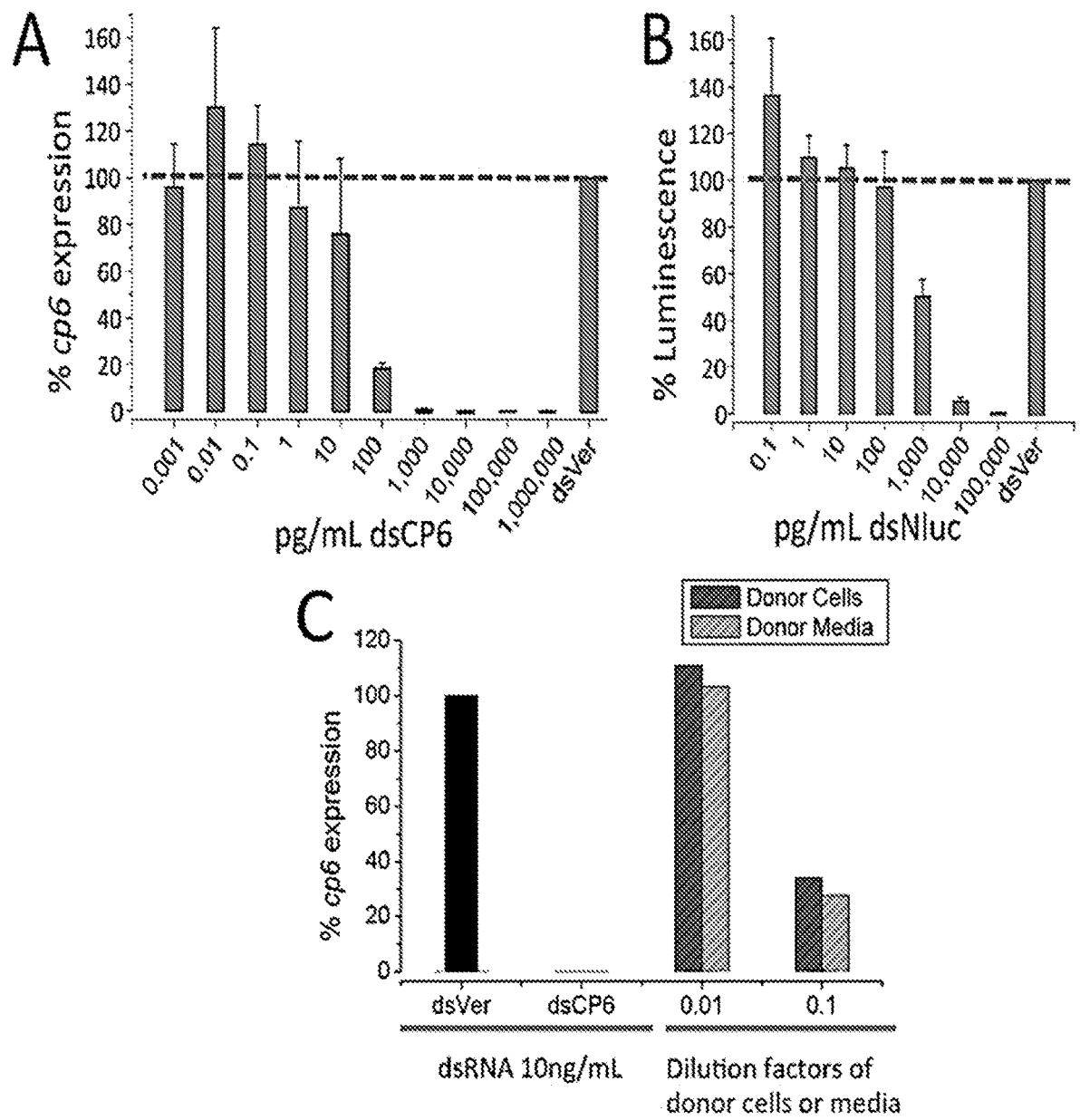
FIG. 10 shows graphs of the efficiency of RNAi in cultured *Tribolium castaneum* (TcA) cells shown by (A) dsRNA targeting cuticle protein 6 (CP6) or by (B) dsNluc, a fluorescent reporter gene overexpressed in TcA cells using a heat shock protein promoter. The results from quantitative RT-PCR were normalized to rps3 expression and averaged with the SD for three replications for measuring cp6 transcript levels. (C) Effects of donor cells and conditioned media (treated with dscp6) on target CP6 transcript levels in acceptor cells (0.1-10-fold dilution; 0.01-100-fold dilution. The units for dsRNA concentration are shown as p=pg/mL and n=ng/mL.
Figure 11:
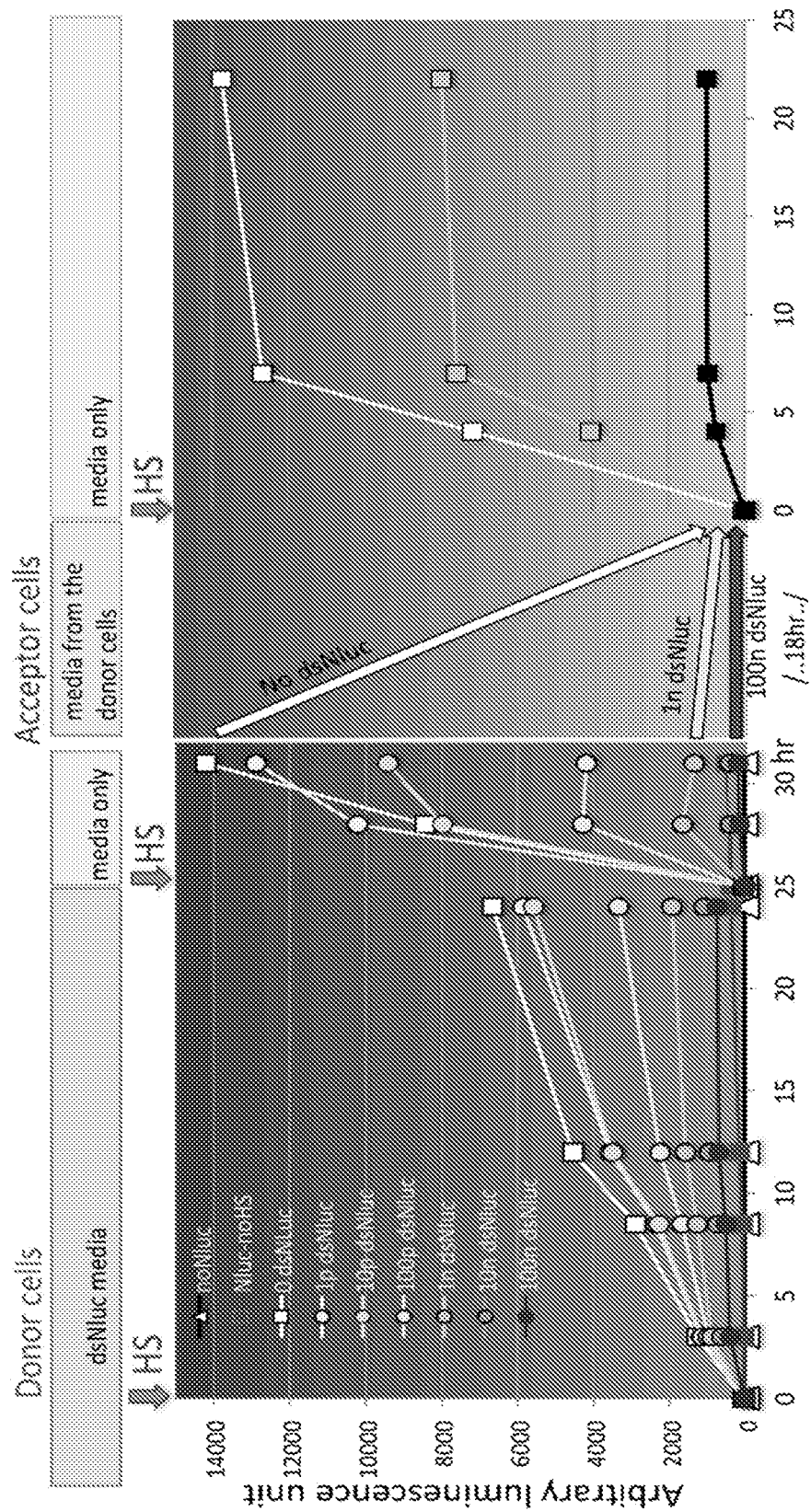
FIG. 11 is an illustration and graph of the RNAi of the Nluc reporter with different doses of dsNluc. The acceptor cells were treated with the donor media at 1×. Heat shock (HS) is marked by red arrows. The components of the culture media are on the top boxes. The units for dsRNA concentration are shown as p=pg/mL and n=ng/mL.

Similar research was conducted using *Tribolium castaneum* (TcA, red flour beetle) cells to produce EVs. Conditioned media collected from these cells after treatment with double-stranded RNA (dsRNA) can produce an RNAi response in naïve (untreated) cells of the same species. TcA cells were highly sensitive to treatment with dsRNA specific to cuticle protein 6 (CP6; FIG. 10(A)) or to dsNluc, a dsRNA targeting a fluorescent reporter overexpressed in TcA cells using a heat shock promoter (FIG. 10(B)). Treatment of naïve TcA cells (acceptor cells) with dilutions of either TcA cells treated with dsCP6 (donor cells) or conditioned media of TcA cells treated with dscp6 (donor media) results in high levels of suppression of CP6 transcript levels (FIG. 10(C)). FIG. 10D shows the time course of suppression of Nluc expression in donor and acceptor cells following treatment with dsNluc or donor media, respectively. Heat shock (HS) was used in these experiments to induce high levels of expression of Nluc, the fluorescence of which could be observed and quantified. Dose-dependent suppression of Nluc fluorescence was observed following treatment with different concentrations of dsNluc in donor cells (left side of FIG. 11). Further, treatment of acceptor cells with donor media from donor cells treated with 1 or 100 ng/mL dsNluc also suppressed Nluc fluorescence following heat shock. These results suggest that specific components of conditioned media from TcA cells were able to induce an RNAi response in targeted acceptor cells.

Our results show that EVs from two different beetle species are capable of enhancing RNAi in cultured cells that are refractory to dsRNA treatment and are a promising target for unraveling the mysteries surrounding systemic RNAi responses in Coleoptera.

Example 2

In Vivo Insect Studies

Figure 12:
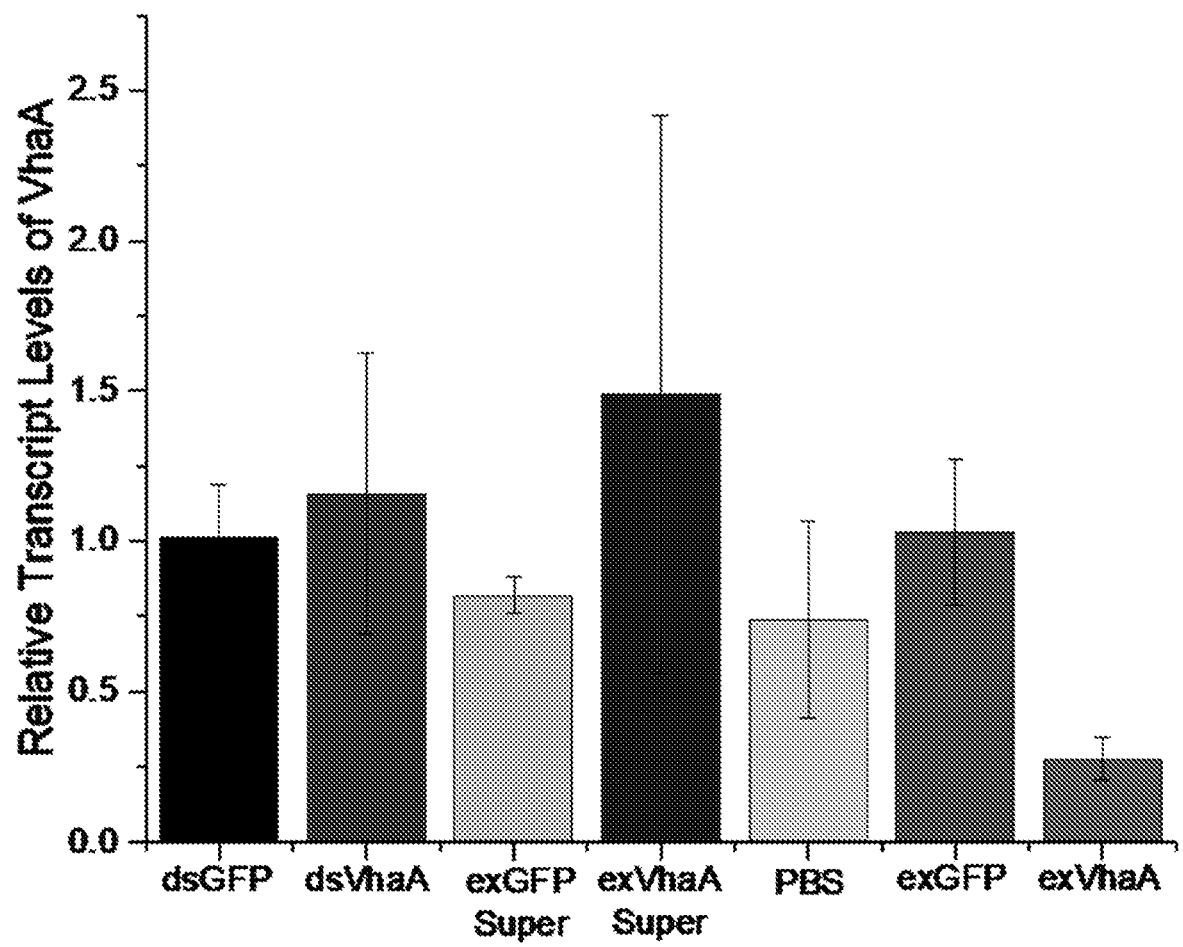
FIG. 12 is a graph showing suppression of v-ATPase A transcript levels in adult female *Ae. aegypti* mosquitoes. Injection of naked dsRNA (dsGFP, dsVhaA) or supernatants from exosome isolation had no effect on transcript levels, but injection of exosomes isolated from SCR cells treated with dsVhaA suppressed transcript levels in mosquito adults.

The foregoing in vitro experiments provide clear evidence for the role of EVs in transporting RNAi signals between insect cells as well as their potential in strategies for enhancing RNAi in refractory insect species, but in vivo experiments are necessary to better understand how EVs might be employed to this end. Accordingly, we have isolated EVs from SCR cells treated with dsAaVhaA and injected them into adult female *Ae. aegypti* mosquitoes and isolated RNA and measured the relative transcript levels of v-ATPase A after 48 h (FIG. 12). Our results show that injection of adult mosquitoes with EVs derived from SCR cells treated with dsAaVhaA resulted in high levels of suppression of the target transcript levels, whereas injection of naked dsRNA or supernatants from exosome isolation had little or no effect.

Example 3

Insect EVs For RNAi In Mammalian Cells

Figure 13:
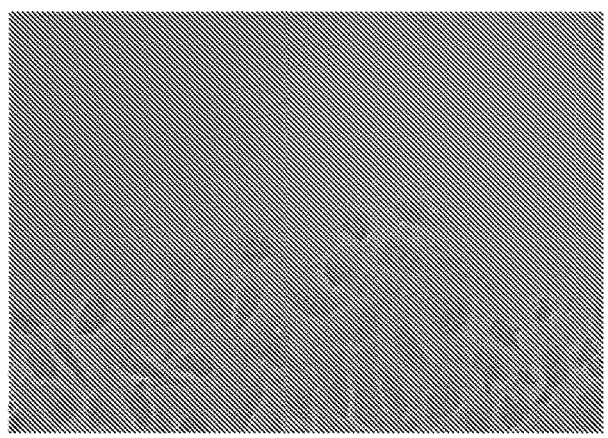
FIG. 13 shows images and data for the effects of exosomes isolated from SCR cells treated with dsRNA specific to (A) SCR Snf7 (DuSnf7, non-targeting RNA control), or (B) Rat Capn2 (RnCapn2) on migration of IEC-6 cells in a traditional scratch assay, with arrows indicating abnormal cellular morphology commonly associated with inhibition of calpain expression; and (C) a graph showing quantification of migration with a modest reduction in migration in IEC-6 cells treated with exosomes from SCR cells treated with dsRnCapn2.
Figure 13:
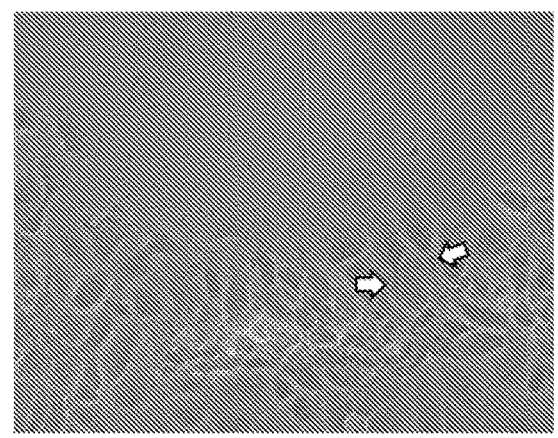
Figure 13:
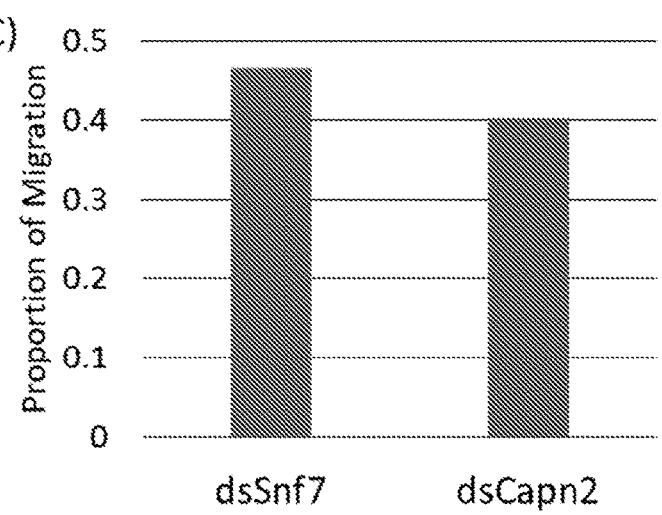

Experiments were conducted to determine if insect EVs could deliver RNAi signals to mammalian cells. In these experiments, SCR cells were treated with dsRNA specific to rat (*Rattus norvegicus*) calpain 2 (RnCapn2), a gene that has important roles in cell migration in rat intestinal epithelial cells. EVs isolated from the cell media supernatant were then incubated with IEC-5 cells. Migration assays (scratch assays) were then performed where a monolayer of cells was scraped with a razor blade to remove adherent cells and simulate a wound. Photos of migrating cells were taken to assess the ability of IEC-6 cells treated with beetle EVs loaded with Capn2 dsRNA to migrate in vitro. Migration was determined as the percentage of a defined area covered by migrating cells. After 48 h, a functional assay of the ability of the cells to migrate in a scratch assay and RNA was isolated to assess transcript levels. Though we could not detect any changes in the transcript levels of Capn2 in IEC-6 cells (data not shown), functional assays showed modest suppression of migration in IEC-6 cells (FIG. 13) as well as characteristic anomalies (retained cellular attachments at the rear of migrating cells, indicated by arrows, FIG. 13) in cellular morphology associated with suppression of calpain 2 expression in migrating cells. The results show that cells treated with EVs isolated from beetle cells treated with dsCapn2 exhibited morphological changes consistent with those observed in migrating cells with suppressed calpain activity (see arrows below) as well as reduced levels of migration 15% below those of cells treated with EVs from beetle cells treated with a non-targeting dsRNA. Though not conclusive, these results suggest that insect EVs may also have potential for use inother organisms besides insects, including in mammals.

Example 4

Ongoing Work

Current efforts aimed at understanding the roles of exosomes in insect physiology are focused on characterizing the exosomes and their cargoes. RNA samples from the SCR cell line were submitted for transcriptome sequencing on the Illumina 6000 platform (stranded mRNA, 25 million reads) as well as from EVs isolated from either untreated SCR cells or those treated with dsGFP for mRNA (stranded, 5 million reads each) and small RNA (5 million reads each) sequencing (See FIGS. 7 and 8). We are working on identifying proteins associated with SCR EVs and have isolated total protein lysates for SDS-page analysis and subsequent LC-MS identification.

Agricultural productivity relies on a variety of factors, not the least of which is protecting crops from insect pests that can inflict devastating losses. With rising incidences of insecticide resistance and increasing public concern about the use of chemical insecticides, novel, environmentally friendly pest control strategies are desperately needed. This work seeks to enhance our understanding of RNAi and its systemic spread throughout insects, developing methods to enhance RNAi efficiency in refractory insect species, and providing basic data about the biogenesis and roles of EVs in insect physiology, which may result in the development of new pest control strategies. Furthermore, the research allows a better understanding of the systemic spread of the RNAi response in rootworms.

This project will identify specific components of the exosome biogenesis pathway, demonstrate the roles exosomes play in the systemic spread of RNAi, and show that exosomes can enhance RNAi. A broader understanding of the biogenesis of exosomes and their ability to move between insect cells permits exploration of these membrane vesicles as delivery vehicles for cargos other than dsRNAs, as well as their broader roles in insects and their interactions with the environment. Exosomes are also thought to be involved in immune responses and cross-species communication, including those between insects and microbes and insects and plants, highlighting their future potential as targets for insecticide development or manipulation for modulation of insect vector capacity or fecundity.

Figure 14:
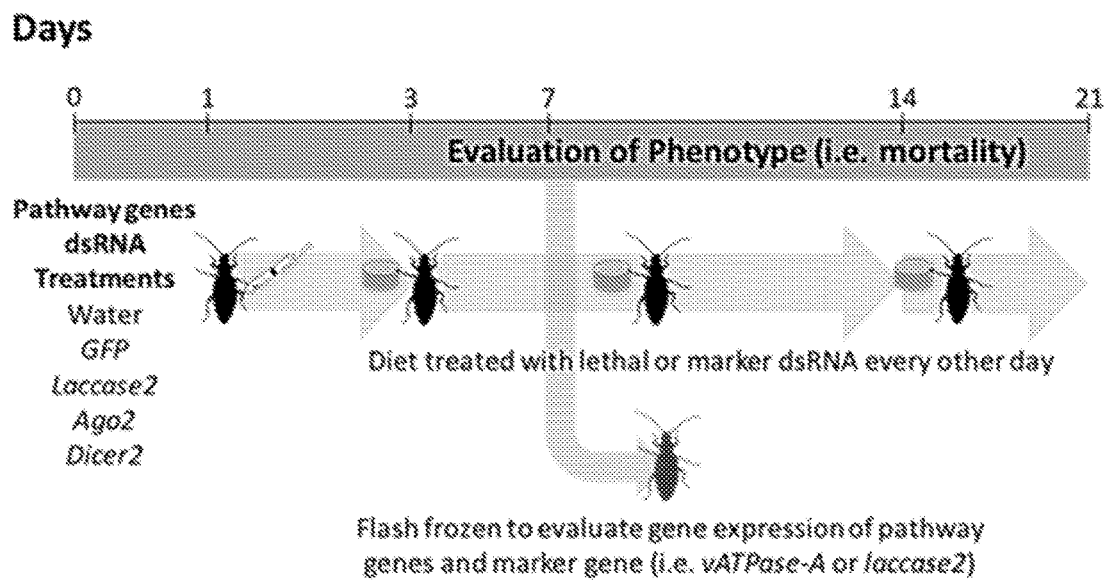
FIG. 14 is an illustration of the RNAi of RNAi approach to determine the role of pathway genes in the dsRNA processing.
Figure 15:
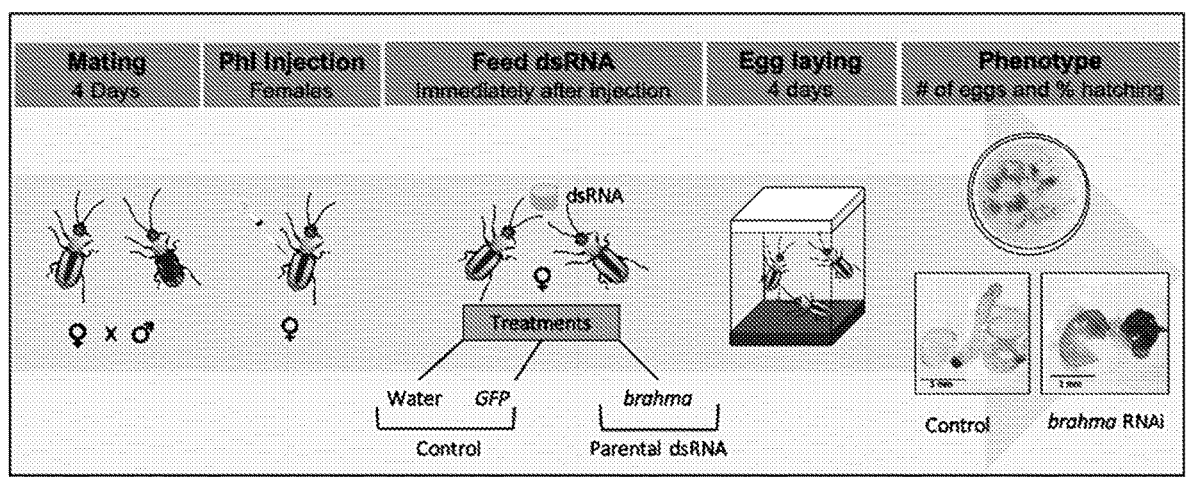
FIG. 15 is an illustration of the experimental paradigm for parental RNAi with pharmacological inhibitors (PhIs).
Figure 16:
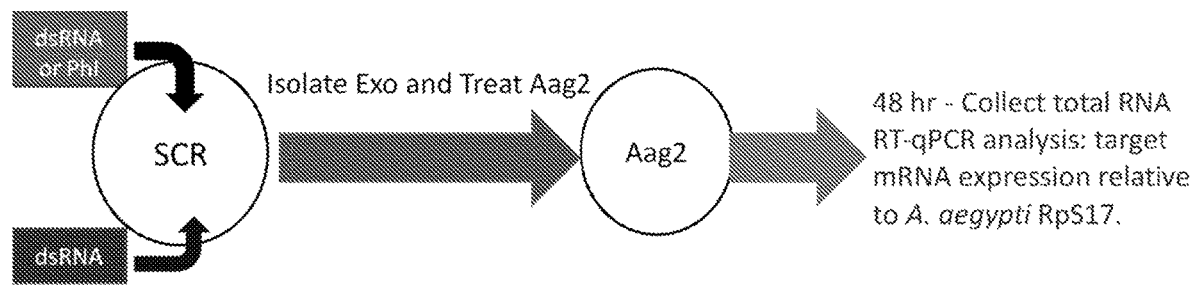
FIG. 16 is an illustration of the experimental paradigm for identifying exosome biogenesis genes in SCR cells. Blue dsRNA (candidate genes) or PhI are intended for disruption of exosome production and red dsRNA are for the reporter gene in Aag2 cells.

The highly versatile SCR research model that we have developed includes paired in vitro/in vivo study systems where hypotheses can be developed and tested in a simple, easily manipulated, highly efficient cell culture system that features largely homogenous cells. Experiments can then be moved to the whole SCR insect, where the hypotheses that were developed in vitro can be validated using in vivo tests. In this model system, we can take advantage of the efficiency, low cost, and easy manipulation of cultured insect cells to streamline and inform subsequent in vivo experiments that are often much more time consuming and costly. The RNAi of RNAi technique can be used as part of the study, which involves knockdown of a pathway gene before administering diet treated with lethal dsRNA (v-ATPase A) as a reporter gene (FIG. 14). If a gene product is indeed involved in an RNAi response, RNAi suppression of its transcript results in a depressed RNAi silencing of the reporter gene and a reduction in the phenotype.

Approach

Objective 1. Identify the critical components that are required for exosome formation and the systemic spread of RNAi in SCR cultured cells and in SCR whole insects. Our preliminary data from SCR and mosquito cell lines indicate that exosomes isolated from SCR cells treated with dsRNA complementary to the *Ae. aegypti* v-ATPase subunit A gene carried an RNAi signal that reduced transcript levels in cultured Aag2 cells. Given the role exosomes are playing in the spread of RNAi signals and our lack of knowledge about exosome biogenesis, we use a combined in vitro and in vivo model with *D. undecimpunctata* to determine the cellular pathways that are vital to exosome formation and systemic spread of the RNAi signal.

Aim 1: Identify key components for exosome formation and systemic RNAi in the SCR cell line using RNAi or RNAi and PhIs. Although a significant amount of work has been devoted to identifying the pathways for exosome biogenesis in mammals, very little effort has focused on understanding these pathways in insects. Accordingly, we have selected 13 genes (Table 1) that are crucial components of the exosome biogenesis and export pathway, as identified in research from mammalian systems.

TABLE 1

Candidate genes and PhI involved in exosome biogenesis to be examined in this study

| Function | Gene | Pharmacological Inhibitor (PhI) |
|---|---|---|
| 1. MVB formation | Alix/Syntenin<br>Tsg101<br>nSMase2<br>clathrin | GW4869, ceramide kinase inhibitor II |
| 2. MVB fusion with cell membrane | Rab11<br>Rab27<br>Rab35<br>SNARE VAMP7<br>SNARE YKT6 | CID 1067700, GGTI-2133 |
| 3. Exosome release | Tetraspanin CD9<br>Tetraspanin CD63<br>Tetraspanin CD81<br>Tetraspanin CD82 | Fluvastatin orTipifarnib |

The hypothetical exosome biogenesis pathway and the genes involved in each step (MVB formation, fusion and release) are illustrated in FIG. 1. *Drosophila* and mammalian sequences are used as queries to identify the candidate genes from the SCR cell line and SCR master transcriptome. We use RNAi to silence expression of each one of these transcripts or a PhI, and then test the ability of the exosomes produced from these cells to elicit an RNAi response and/or to enter Aag2 cells.

The experimental paradigm is illustrated in FIG. 16 and identical to that used in our preliminary data. First, SCR cells are treated with dsRNA specific to one of the candidate genes or with one of the PhIs listed in Table 1 (all commercially available, blue box in FIG. 16).

For RNAi of RNAi experiments, 24 h after treatment with dsRNA of the candidate gene, SCR cells are treated with a reporter dsRNA specific to a gene in Aag2 cells (red dsRNA in FIG. 16). For the PhI experiments, SCR cells are treated with the reporter dsRNA 1 h after treatment with the PhI. After 48 h, exosomes are harvested using our established laboratory protocols and use these exosomes to treat Aag2 cells. Forty-eight hours after treating Aag2 cells with exosomes, RNA is harvested and measure transcript levels of the candidate and reporter genes using RT-qPCR with gene-specific primers. v-ATPase A and Snf7 are used as reporter genes. Although these genes are involved in the generation and maturation of vesicles and endosomes in cells, our preliminary data show that treatment with dsRNA for *Ae. aegypti* v-ATPase A does not affect the RNAi response in SCR cells (FIG. 6). However, we will check for 21 bp matches between the mosquito reporter gene and its counterpart in SCR to ensure that there are no unintended effects.

Our preliminary data showed that fully functional exosomes from SCR cells can elicit an RNAi response in cultured Aag2 cells. If the exosome biogenesis pathway is disrupted by silencing one of the genes in Table 1 or by using an inhibitor in Table 1, then we expect the ability of SCR-derived exosomes to produce an RNAi response in Aag2 cells to be diminished. We exosomes isolated from SCR cells treated with dsRNA specific to Ago2, an integral component of the core RNAi machinery, are used along with treatment with dsRNA specific to GFP as positive and negative controls, respectively.

As a follow-up to these experiments, exosomes isolated from SCR cells previously treated with dsRNA specific to the candidate genes or PhIs in Table 1 are labeled with SYTO-select RNA stain (as shown in our preliminary data in FIG. 4). Cultured Aag2 cells are then treated with the labeled exosomes and confocal microscopy is used to ascertain their ability to enter the target cells. Suppression of the expression of specific exosome components may disrupt uptake if those components are necessary for exosome recognition by target cells or exosome production. If the cells are stained green in our experiments, then we may conclude that the exosomes are still produced and able to enter the Aag2 cells, and any disruption of the RNAi response is for other reasons. If the staining is reduced, then the ability of exosomes to be produced or taken up by target cells is likely diminished as a result of treatment with the candidate gene dsRNA or PhI and any disruption of the RNAi response in the Aag2 cells is the result of disruption of exosome production or uptake. dsAgo2 and dsGFP are used as positive and negative controls, respectively, as well as supernatants from exosome isolation and RNA isolated from exosomes. Further analysis of exosomes that fail to elicit an RNAi response in Aag2 cells will include transmission electron microscopy and Nanosight analysis to confirm the presence or absence of exosomes and their morphological appearance and size.

We have established protocols for all the experiments outlined above that involve exosome isolation, dsRNA treatment, RNAi of RNAi, cell culture (both SCR and Aag2), confocal and electron microscopy, fluorescent staining, and spread of RNAi via exosomes. The use of the dual SCR-Aag2 cell culture system in this aim is ideal because the insensitivity of the Aag2 cell line to naked dsRNA limits the potential for confounding results due to naked dsRNA carryover. Suppression of a combinations of genes from Table 1 may be used to enhance our results. The use of PhIs to disrupt exosome formation further enhances the likelihood of successfully identifying components of the exosome biogenesis pathway. Additional genes are evaluated with the RNAi of RNAi approached if needed, based on the results with the PhIs.

The data are mined for candidate gene sequences (Table 1) and compared to *D. v. virgifera* genome, with which *D. undecimpunctata* is closely related and has informed other experiments.

Results

Suppression of one or more of the candidate genes and/or use of the PhIs listed in Table 1 will inhibit the ability of SCR exosomes to suppress the transcript levels of the reporter gene in Aag2 cells as a result of our hypothesis that each of these genes are necessary components of the exosome biogenesis pathway. Further, suppression of tetraspanin, integral membrane proteins in exosomes, transcript levels will result not only in inhibition of induction of RNAi in Aag2 cells, but also reduced uptake of labeled exosomes into Aag2 cells without reducing exosome numbers measured by confocal microscopy and TEM. These results will enhance our understanding of exosome production and uptake in insects.

Aim 2: Determine the pathways necessary for exosome biogenesis and systemic spread of RNAi in SCR adults using PhIs. To complement the experiments performed with the SCR cell line, we will determine if the inhibition of exosome biogenesis pathways impairs the systemic spread of RNAi in SCR adults following oral administration of dsRNA.

The developmental gene brahma (brm) are used as the reporter gene for in vivo PhIs experiments. Brahma was selected since it can generate a parental RNAi (pRNAi) response that allows quantification of gene expression and phenotype in adult female ovaries and their offspring following treatment with dsRNA. This gene has been explored in WCR, and the experimental paradigm and phenotype is illustrated in FIG. 15.

Briefly, virgin SCR females and males are allowed to mate for four days. Males are removed, and females are injected with the PhIs in Table 1 and immediately placed on containers with artificial diet treated with dsbrm for four days. Females are then transferred to egg cages for laying, and the number of eggs and larval hatching are evaluated after 12 days, the same as the WCR experiments (FIG. 15). Brm is a chromatin-remodeling ATPase, and its knockdown inhibits embryonic development. Four females per treatment (i.e., water, dsGFP, and dsbrm) are flash-frozen at the time of transferring to the egg cages to evaluate the transcript levels of genes involved in the specific exosome biogenesis function being inhibited (Table 1) and brm in the ovaries. Before the experiments with the PhIs are performed, we will evaluate the concentrations used in SCR to determine the optimal conditions to perform the PhI experiments. All in vivo assays will include three biological replicates (i.e., insects from three different generations) with 12 insects per treatment per biological replicate for a total of 36 insects per treatment.

In an additional set of experiments, we will determine the timeline of the systemic spread of RNAi in SCR by feeding SCR adults with brm dsRNAs. We will ascertain the timing of the systemic spread of RNAi by dissecting insects at specific time points following feeding on diet treated with dsRNA (i.e., 30 min, 1 h, 3 h, 6 h, and 12 h, whole body knockdown is observed by 24 h in SCR). By monitoring transcript levels in distant tissues, we can define the time course over which an RNAi signal spreads from the gut to distant tissues (i.e., gut, fat body, hemolymph and ovaries). Insects fed with water and dsGFP are used as negative controls. We will include three biological replicates with five insects per time point for a total of 25 insects per treatment. Four insects per treatment are flash-frozen for evaluation of brm transcript levels. Using this information, we will then harvest hemolymph from SCR adults at the time point when we are certain that the RNAi signal has spread and three replicates of five insects per treatment are fed with dsGFP and water. We will isolate RNA from hemolymph exosomes and small RNAs are subsequently sequenced to determine if exosomes generated in vivo are able to transmit RNAi signals to other tissues.

To determine if the exosomes isolated from insects and SCR cells treated with dsRNA can transmit an RNAi response to another individual, we will isolate exosomes from hemolymph of dsbrm treated and untreated SCR adults and inject them into naïve SCR adults. We will also feed naïve SCR adults with cell line exosomes treated with dsbrm. As negative controls, we will use the supernatant from exosome isolations from hemolymph and/or cell culture media and naked dsGFP, whereas naked dsbrm are used as a positive control. Similar to previous experiments, we will include three biological replicates with 12 insects per treatment for a total of 36 insects per treatment. Four insects per treatment are flash-frozen 48 hours after feeding dsbrm for evaluation of transcript levels for brm. For all experiments, SCR adults are sourced from Crop Characteristics, dsRNA are purchased from Genolution. Transcript levels quantification with RT-qPCR are performed using the comparative 2-ddCt method and normalized to species-specific Actin.

To increase the evidence that exosomes can enhance RNAi response in SCR, SCR exosomes are labeled with SYTO-select RNA stain, as in our preliminary data. These exosomes are fed to SCR adults. Guts are then be dissected from insects at various time points (0 to 4 h) after feeding of labeled exosomes, fixed in 4% paraformaldehyde, counterstained with DAPI, and fluorescence microscopy are used to visualize exosome uptake directly as shown in the preliminary results. These experiments will demonstrate the validity of our in vitro results and establish important components of the exosome biogenesis pathway and the systemic RNAi response in *Diabrotica*. Furthermore, these experiments will provide essential information about the timeline of RNAi responses in SCR and provide concrete evidence that exosomes are vital for mounting systemic RNAi responses in *Diabrotica*. As a result, these experiments will enhance our understanding of RNAi responses and will give insight on how to employ exosomes as delivery vehicles for enhancing RNAi responses in other insects and using these techniques in pest control strategies.

Objective 2: Evaluate the ability of SCR exosomes to enhance RNAi in two species with low RNAi efficiency, *Spodoptera frugiperda* and *Aedes aegypti*. Exosomes derived from SCR cells treated with dsRNA of the lethal gene Sec23 specific to the fall armyworm (*S. frugiperda*, FAW) and *Ae. aegypti*, are evaluated in vivo by injection and feeding to determine if exosomes enhance RNAi responses. We have selected Sec23 as the target gene since the primers and/or sequences are available for both species. The selected species belong to Lepidoptera and Diptera, respectively, orders of insects that typically show low RNAi efficiency.

Bioassays with both insects are performed using injection to deliver exosomes to insects. Subsequently, feeding assays may be used to simulate more "real world" situations. For all assays we will use highly concentrated exosome suspensions from cells treated with dsRNA for the lethal gene Sec23 to determine the effectiveness of exosomes. dsRNA primers for *S. frugiperda* are available in the literature and the *Ae. aegypti* sequence is available in GenBank (accession number XM_001652733.2, incorporated by reference herein). Since we have not previously used this gene in *S. frugiperda* or *Ae. aegypti*, PCR sequences are sent for sequencing to confirm the gene before synthesizing the dsRNA. dsGFP are used as negative control. We will evaluate naked dsRNA, SCR exosomes containing dsRNA, and RNA extracted from SCR exosomes, and for each case we will have GFP and species-specific Sec23, to determine if SCR exosomes improve the RNAi response in *S. frugiperda* and *Ae. aegypti*. Additional controls will include exosome isolation supernatants for a total of ten treatments per species. For all assays, Sec23 gene knockdown is evaluated 48 hours after treatment and mortality are evaluated every other day for 10 days. dsRNA is synthesized. Quantification of transcript levels with RT-qPCR are performed using the comparative 2-ddCt method and normalized to species-specific Actin (for *S. frugiperda*) and *Ae aegypti*.

Injection assays are performed by injecting 0.6 µl to synchronized second instar *S. frugiperda*. After injection, *S. frugiperda* larvae are individually placed in cups with artificial diet for the remainder of the experiment. *S. frugiperda* cups are held in an incubator at 27° C., 14 h Light: 10 h Dark, and 80% RH. *Ae aegypti* adults (2 to 5 day old females) are injected with 50 nl, then kept in plastic cups at 25-28° C., 70-80% RH with a photoperiod of 16:8 h (Light:Dark) and maintained on a 10% sucrose solution. For both insects, mortality is evaluated every other day for 15 days. Each experiment is replicated three times with three different generations representing three biological replicates, with 20 insects per treatment/replication. Two to four insects per treatment are flash-frozen 48 h after injection to evaluate Sec23 knockdown. Gene knockdown and percent mortality are compared between treatments to determine if the exosomes improve RNAi responses in *S. frugiperda* or *Ae. aegypti*.

If the injection assays are successful, we will proceed to feeding assays. *S. frugiperda* feeding assays are performed in 128-well bioassays trays (CD International). For *Ae. aegypti*, pupae are collected in cartons and maintained on a sterile 10% sucrose diet for the first 24 h post-eclosion. After 48 h of starvation, adult mosquitoes are exposed to sucrose solutions including our treatments (outlined above for injection). Sucrose solutions are prepared in autoclaved ddH$_2$O and 0.5% red food dye and placed in a 1.5 mL tubes with cotton wicks. Mosquitoes are exposed to the sugar solution for 30 min. To verify the acquisition of the sugar meal, the specimens are cold-immobilized at 4° C., counted, and inspected for the presence of dye in the abdomen using a dissection microscope. Numbers of insects, treatment groups, and data collected for both insects are as described for the injection assays. These experiments will determine if exosomes from species with a highly efficient RNAi response, can be used to enhance the RNAi response in species with low RNAi efficiency. Furthermore, it will provide insights into interspecies communication and viability of exosomes for pest control strategies with molecules other than dsRNA.

The invention claimed is:

1. A method generating custom extracellular vesicles as delivery vehicles for nucleic acids, said method comprising:
    incubating nucleic acid for a target gene with beetle cells in serum-free culture media for an effective period of time; and
    collecting extracellular vesicles secreted by said beetle cells, wherein said extracellular vesicles comprise at least a functional fragment of said nucleic acid.

2. The method of claim 1, further comprising combining a plurality of said extracellular vesicles with an agronomically- or pharmaceutically-acceptable delivery vehicle to yield a composition for inhibition of a target gene in a target organism or cell, said composition comprising a plurality of said beetle extracellular vesicles, wherein said nucleic acid is specific for said target gene.

3. The method of claim 2, wherein said target organism or cell is a different species than said beetle extracellular vesicles.

4. The method of claim 2, wherein said target organism or cell is a mammalian cell or organism.

5. The method of claim 2, wherein said nucleic acid molecule is dsRNA, at least one strand having a region of complementarity that is substantially complementary to at least a portion of an mRNA transcript of said target gene.

6. The method of claim 2, wherein said target organism or cell is an arthropod.

7. The method of claim 2, wherein said nucleic acid molecule is RNA.

8. The method of claim 1, wherein said beetle cells are of the genus *Tribolium* or *Diabrotica*.

9. The method of claim 1, wherein said beetle cells are selected from the group consisting of: *Tribolium castaneum* (red flour beetle), *Diabrotica virgifera virgifera* (Western corn rootworm), *Diabrotica undecimpunctata* (spotted cucumber beetle or southern corn rootworm), *Diabrotica barberi* (Northern corn rootworm), *Diabrotica speciosa* (Cucurbit Beetle), and *Diabrotica virgifera zeae* (Mexican corn rootworm).

10. The method of claim 1, wherein said nucleic acid is for a target gene that is of a different species than said beetle cells.

11. The method of claim 1, wherein said nucleic acid is dsRNA for RNAi of a target gene in a target organism or cell.

12. The method of claim 1, wherein said nucleic acid is RNA, wherein said extracellular vesicles comprise RNA fragments ranging from 15 to 45 bp.

13. The method of claim 1, wherein said nucleic acid is incubated with said beetle cells for at least 24 hrs under culture conditions.

14. The method of claim 1, wherein said extracellular vesicles are collected by:
    centrifuging said culture media;
    removing supernatant from the centrifuged media; and
    contacting said supernatant with one or more reagents to separate said extracellular vesicles.

15. The method of claim 14, wherein said contacting step comprises capturing said extracellular vesicles with antibodies and/or magnetic beads.

16. The method of claim 1, said method further comprising contacting a target organism or cell with a composition comprising a plurality of said beetle extracellular vesicles.

17. The method of claim 16, wherein said target organism is a mosquito.

18. The method of claim 10, said method further comprising incorporating a plurality of said extracellular vesicles into an insect bait, said bait comprising a plurality of said beetle extracellular vesicles and an edible arthropod attractant.

19. The method claim 18, wherein said edible arthropod attractant is in a form selected from the group consisting of powder, liquid, gel, tablet, granular, and combinations thereof.

20. The method of claim 18, further comprising providing said insect bait in location where insects may come into direct contact with said insect bait.

21. The method of claim 2, further comprising applying said composition to soil or growth medium of a plant.

\* \* \* \* \*